(12) United States Patent
Black et al.

(10) Patent No.: US 9,740,458 B1
(45) Date of Patent: *Aug. 22, 2017

(54) RESTRICTING CLASS INHERITANCE RELATIONSHIPS

(71) Applicant: The MathWorks, Inc., Natick, MA (US)

(72) Inventors: Jennifer A. Black, Ashland, MA (US); David A. Foti, Holliston, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/673,454

(22) Filed: Mar. 30, 2015

Related U.S. Application Data

(63) Continuation of application No. 13/167,300, filed on Jun. 23, 2011, now Pat. No. 9,015,661.

(51) Int. Cl.
*G06F 9/44* (2006.01)

(52) U.S. Cl.
CPC ............... *G06F 8/31* (2013.01); *G06F 8/315* (2013.01)

(58) Field of Classification Search
CPC .............................................. G06F 8/31–8/315
See application file for complete search history.

(56) References Cited

U.S. PATENT DOCUMENTS

| | | | |
|---|---|---|---|
| 4,914,590 A * | 4/1990 | Loatman | G06F 17/279 704/8 |
| 5,313,633 A | 5/1994 | Tomita et al. | |
| 5,493,680 A | 2/1996 | Danforth | |
| 5,615,400 A | 3/1997 | Cowsar et al. | |
| 5,802,508 A | 9/1998 | Morgenstern | |
| 5,822,587 A | 10/1998 | McDonald et al. | |
| 5,842,220 A | 11/1998 | De Groot et al. | |
| 5,878,411 A | 3/1999 | Burroughs et al. | |
| 5,953,524 A | 9/1999 | Meng et al. | |
| 5,978,582 A | 11/1999 | McDonald et al. | |
| 6,085,034 A | 7/2000 | Danforth | |
| 6,085,198 A | 7/2000 | Skinner et al. | |
| 6,192,371 B1 | 2/2001 | Schultz | |
| 6,226,788 B1 | 5/2001 | Schoening et al. | |
| 6,237,139 B1 | 5/2001 | Hotta et al. | |

(Continued)

OTHER PUBLICATIONS

James Martin, Principles of Object-Oriented Analysis and Design, published by Prentice Hall, 1993, isbn 0137208715, pp. 174-177, 180-183.*

(Continued)

*Primary Examiner* — Tuan Q. Dam
*Assistant Examiner* — Zheng Wei
(74) *Attorney, Agent, or Firm* — Venable LLP; Michael A. Sartori; Ryan T. Ward

(57) ABSTRACT

In an embodiment, a system may include a processor having memory storing processor-executable instructions for a programming environment. The processor may perform the following instructions. A first, second, and third class may be defined. The second class may be defined as being compatible with the first class. The third class may be defined as being incompatible with the first class. A fourth class may be defined as a subclass of both the first class and the second class. A fifth class may be prevented from being a subclass of both the first class and the third class.

17 Claims, 18 Drawing Sheets

(56) References Cited

U.S. PATENT DOCUMENTS

| | | |
|---|---|---|
| 6,275,976 B1 | 8/2001 | Scandura |
| 6,381,743 B1 | 4/2002 | Mutschler, III |
| 6,480,856 B1 | 11/2002 | McDonald et al. |
| 6,901,579 B1 | 5/2005 | Suguta |
| 7,051,338 B1 | 5/2006 | Foti et al. |
| 7,065,742 B1 | 6/2006 | Bogdan |
| 7,158,993 B1 | 1/2007 | Schwabe |
| 7,240,329 B1 | 7/2007 | Long et al. |
| 7,389,493 B1 | 6/2008 | Long et al. |
| 7,516,449 B2 | 4/2009 | Agrawal |
| 7,725,878 B1 | 5/2010 | Long et al. |
| 7,725,904 B2 | 5/2010 | Foti et al. |
| 7,730,465 B2 * | 6/2010 | Sutter ............... G06F 8/315 717/116 |
| 7,761,858 B2 * | 7/2010 | Chang ............... G06F 8/20 700/246 |
| 7,984,416 B2 | 7/2011 | Foti |
| 8,024,701 B2 * | 9/2011 | Cote ............... G06F 8/24 717/106 |
| 8,108,834 B2 * | 1/2012 | Oren ............... G06F 8/31 717/114 |
| 8,327,346 B2 | 12/2012 | Agrawal |
| 8,464,226 B2 | 6/2013 | Foti |
| 8,527,942 B2 | 9/2013 | Foti et al. |
| 9,311,111 B2 * | 4/2016 | Foti ............... G06F 8/315 |
| 2003/0041154 A1 | 2/2003 | Tran |
| 2003/0172192 A1 * | 9/2003 | Carey ............... G06F 9/4433 719/315 |
| 2004/0015812 A1 * | 1/2004 | Sreedhar ............... G06F 8/315 717/100 |
| 2004/0031023 A1 * | 2/2004 | Li ............... G06F 9/4433 717/140 |
| 2004/0172617 A1 | 9/2004 | Ramani et al. |
| 2005/0028174 A1 | 2/2005 | Rossmann et al. |
| 2005/0097514 A1 * | 5/2005 | Nuss ............... G06F 8/31 717/114 |
| 2006/0150146 A1 | 7/2006 | Meijer et al. |
| 2006/0150164 A1 | 7/2006 | Agrawal |
| 2006/0212882 A1 | 9/2006 | Foti et al. |
| 2006/0265690 A1 | 11/2006 | Motoyama et al. |
| 2007/0038988 A1 * | 2/2007 | Das ............... G06F 9/4431 717/157 |
| 2007/0169029 A1 | 7/2007 | Chen |
| 2007/0169040 A1 | 7/2007 | Chen |
| 2007/0226688 A1 | 9/2007 | Foti |
| 2007/0288892 A1 | 12/2007 | Foti |
| 2008/0114804 A1 | 5/2008 | Foti |
| 2008/0155519 A1 * | 6/2008 | Mulvaney ............... G06F 8/51 717/143 |
| 2008/0235661 A1 * | 9/2008 | Arpana ............... G06F 8/30 717/116 |
| 2008/0244510 A1 * | 10/2008 | Cote ............... G06F 8/24 717/108 |
| 2009/0031285 A1 | 1/2009 | Agrawal |
| 2009/0077121 A1 | 3/2009 | Foti |
| 2009/0077536 A1 | 3/2009 | Foti |
| 2009/0183139 A1 | 7/2009 | Foti et al. |
| 2009/0222799 A1 | 9/2009 | Stewart et al. |
| 2010/0076918 A1 * | 3/2010 | Attou ............... G06N 5/025 706/47 |
| 2011/0083162 A1 * | 4/2011 | Sathish ............... G06F 17/3089 726/3 |
| 2011/0107302 A1 | 5/2011 | Du et al. |

OTHER PUBLICATIONS

Tony Sintes, Why not multiple inheritance? Find out why Java's creators prohibited muliple inheritance, published by JavaWorld, Jul. 19, 2002, p. 1.

Aaron Ponti, Advanced Programming in MATLAB, published Sep. 3, 2010, pp. 1-84.

James Martin, Principles of Object-Oriented Analysis and Design, ISBN 0-13-720871-5, published by Prentice-Hall, 1993, pp. 174-177.

* cited by examiner

RESTRICTING CLASS INHERITANCE RELATIONSHIPS

RELATED APPLICATIONS

This patent application is a continuation of U.S. patent application Ser. No. 13/167,300, filed Jun. 23, 2011. The above-identified application is hereby incorporated by reference in its entirety.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

Overview

In a programming environment a class may be a collection of related attributes and behaviors. A superclass may be a class from which other classes are derived. A subclass may be a class that inherits attributes and/or behaviors from another class. Subclassing may be the action of classes inhering from another class. Thus, class inheritance may be a way to relate two or more classes to each other.

Through the use of class inheritance, programming environments may support the ability to define a set of zero or more superclasses from which a given class is derived. With multiple inheritance, for example, there may be no limit on the number of superclasses for a given class.

Software developers may desire a programming environment to provide robust and expressive techniques for placing restrictions on class relationships and for explicitly expressing compatibility with other class types.

Example Programming Environment

Figure 1:
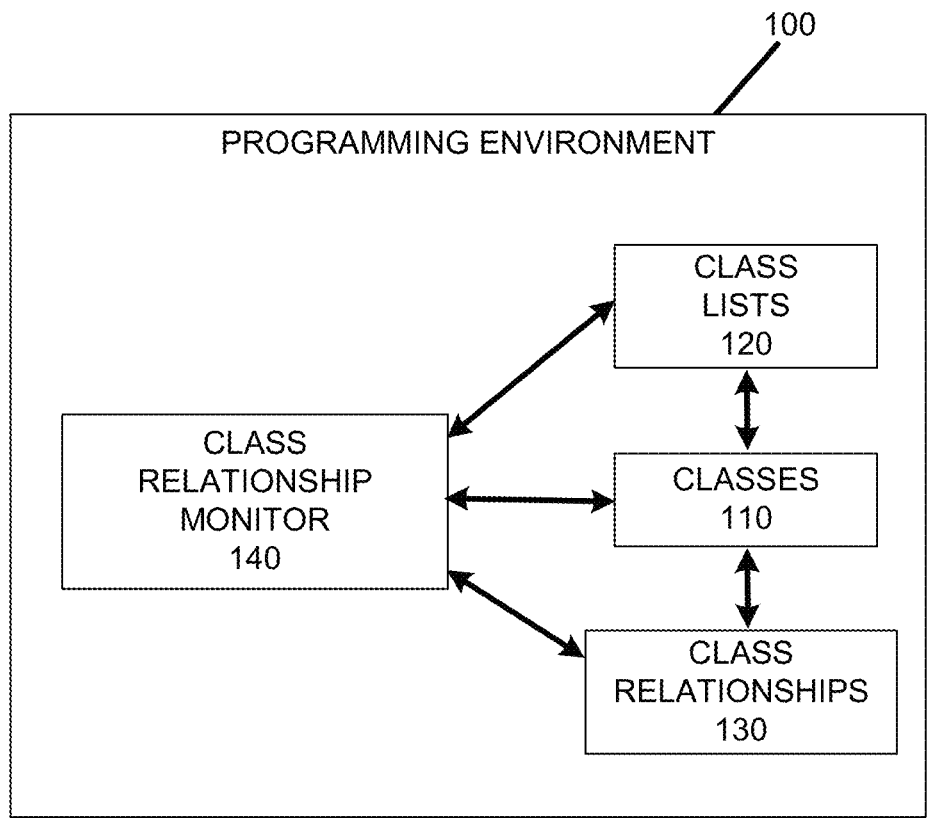
FIG. 1 illustrates an example of a programming environment 100 that may implement an embodiment of the invention.

FIG. 1 illustrates an example of a programming environment 100 in an example embodiment of the invention. The programming environment 100 may include classes 110, class lists 120, class relationships 130, and class relationship monitor 140.

Classes 110 may include one or more classes. A class may be defined by a class definition. The class definition may specify data members (e.g., properties) and member functions (e.g., behaviors) that may belong to the class. An object is an instance of a class. The object contains the data members (as data) and the member functions (as code).

A superclass, base class, or parent class may be a class 110 from which other classes 110 are derived. The classes 110 that are derived from a superclass may be known as child classes, derived classes, or subclasses. A subclass may inherit aspects of its definition from its superclass. Subclasses and superclasses are sometimes referred to as derived and base classes, respectively.

A superclass may allow for a generic interface to include specialized functionality through the use of virtual functions. Subclasses that wish to implement special behavior may do so via virtual methods, without having to reimplement the superclass' behavior.

A subclass may be envisioned as "a kind of" its superclass, as in "a square is a kind of rectangle." For example, a rectangle has four sides with lengths w and h. A square has all of the characteristics of a rectangle and in addition, w=h.

In this way, a subclass may be a more specific version of the superclass. For example, all rectangles have four sides, while the square has the more restricted feature that all of the square's sides have the same length.

An object may be created which may be an instance of a class. For example a dog class may be a base class for a Labrador_retriever class. Creating an object which is an instance of the class labrador_retriever may refer to one particular Labrador_retriever. There may be many instances of labrador_retrievers.

Class lists 120 may include one or more collections of classes 110.

Class relationships 130 may include information about one or more relationships between two or more classes 110 and/or one or more class lists 120. The relationships in class relationships 130 may include, for example, compatibility (e.g., whether one or more classes 110 and/or class lists 120 are compatible), non-compatibility (e.g., whether one or more classes 110 and/or class lists 120 are explicitly not compatible), inclusion (e.g., whether one or more classes 110 and/or class lists 120 are included together), exclusion (e.g., one or more classes 110 and/or class lists 120 cannot be included together), or other relationships between the one or more classes 110 and/or class lists 120.

Class relationship monitor 140 may monitor the class relationships 130 of the classes 110 and class lists 120. Class relationship monitor 140 may prohibit subclassing of a class, when, for example, an object, that is an instance of the class, is created.

Figure 2:
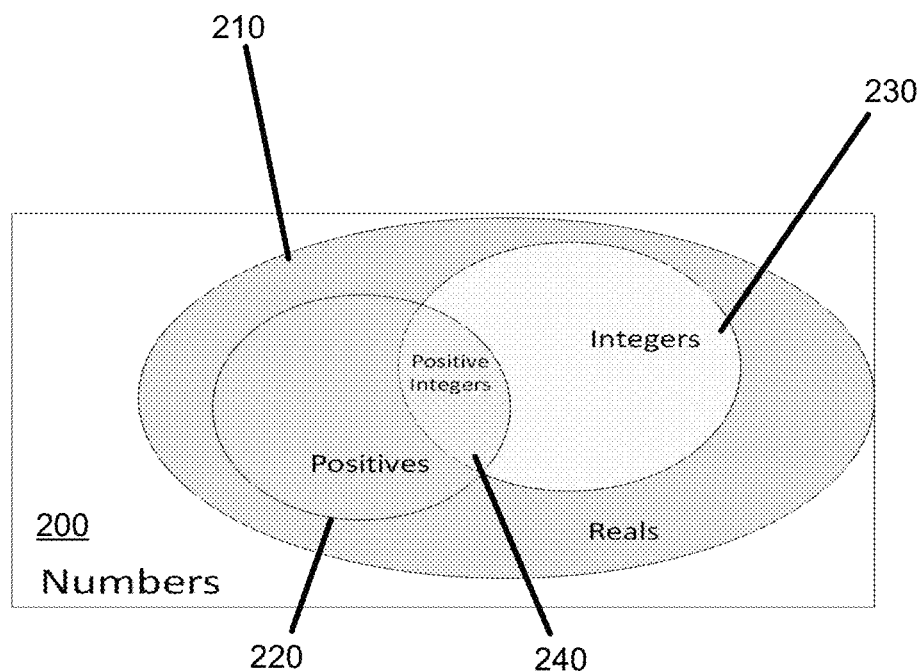
FIG. 2 illustrates a Venn diagram depicting example of class relationships between various example classes in an embodiment of the invention.

FIG. 2 illustrates a Venn diagram depicting an example of class relationships 130 between various example classes in an embodiment. Referring to FIG. 2, the example classes 110 include a class of all numbers 200, a class of real numbers 210, a class of positive numbers 220, a class of integers 230, and a class of positive integers 240.

As illustrated, the class of positive numbers 220 and the class of integers 230 exist within the class of real numbers 210. The intersection of the class of positive numbers 220 and the class of integers 230 may be represented by the class of positive integers 240. Thus, specifying multiple superclasses (e.g., the class of positive numbers 220 and the class of integers 230) may be an intersection operation, where the set of instances of the resulting subclass (e.g., the class of positive integers 240) may be the intersection of the sets of all instances of the specified superclasses.

Some programming environments may not provide the ability for a class to control whether or not it is subclassed. For example, a programming environment may not allow a class to be declared as sealed. Thus, control over whether the class may be subclassed may not be provided by the programming environment. Likewise, for example, a programming environment may require that all superclasses of a given class be, for example, either handle classes or non-handle classes (e.g., a value class). A value class may be defined such that when an instance of a value class is assigned to a variable or passed as a function parameter, a copy of the instance is actually assigned to the variable or passed as the function parameter, respectively. The copy of the instance may include a copy of each property value from the original instance.

A handle class may be defined such that when an instance of a handle class is assigned to a variable or passed as a function parameter, a copy of a handle for the instance (e.g., a pointer to the instance) is actually assigned to the variable or passed as the function parameter, respectively. Thus, in a handle class, a copy of the underlying properties is not made when assigning a handle class instance to a variable or passing a handle class instance as a function parameter. Multiple variables and parameters may reference the same handle class instance and thus may reference the same data values stored in properties of the handle class instance.

In some situations, class authors may wish to limit the number of and types of classes available for superclasses of a given class. In other situations, class authors may want to indicate whether a class is compatible with two or more different class types. For example, whether a utility class may be used with both a handle class and with a non-handle class.

Embodiments

An embodiment may include one or more of the following class inheritance controls: (1) Identifying non-handle classes as combinable with handle classes; (2) Identifying a set of allowable subclasses; (3) Disallowing a specific class from being subclassed by a given class (e.g., set exclusion); (4) Selecting a specified number of classes from a fixed class list (e.g., partition); (5) Selecting at least a specified number of classes from a fixed class list (e.g., intersection); (6) Selecting at most a specified number of classes from a fixed class list; (7) Combining rules to form compound expressions. These inheritance controls may be part of the class relationships 130 of the programming environment 100. These inheritance controls are discussed below.

(1) Identifying Non-Handle Classes as Combinable with Handle Classes

Some programming environments 100 may require that a superclass be of a specific type. Here, mixing superclasses that are of one type with superclasses that are of another type may not be allowed.

For example, programming environment 100 may require that all superclasses be either handle classes or non-handle classes. Thus, mixing handle superclasses with non-handle superclasses may not be permitted.

In an embodiment of the invention, a handle-compatible (HANDLECOMPATIBLE) attribute may be associated with a class to allow class authors to identify non-handle classes that may be combined with handle classes. A class with its HANDLECOMPATIBLE attribute set to true may be combined with a handle class. The HANDLECOMPATIBLE attribute may identify a non-handle class that may be compatible with handle classes. This may allow a class author to specify that a base class may be designed for use with both handle and non-handle classes, while also preventing non-intentional combinations from occurring.

A class with a true value for its HANDLECOMPATIBLE attribute may be referred to as a handle-compatible class. A handle-compatible class may be a class that is compatible with a handle class but is not necessarily a handle class. For example, suppose a non-handle class is associated with a HANDLECOMPATIBLE attribute. Setting the HANDLECOMPATIBLE attribute to true may make the class handle compatible. Note, however, that even though this class is handle-compatible, this class still remains a non-handle class. A handle class may be considered handle-compatible whether or not it explicitly specifies true for the HANDLECOMPATIBLE attribute.

A handle-compatible class may be allowed to be combined with handle classes when forming sets of superclasses. Thus, a single base class may be used with both handle and non-handle subclasses without making all base classes support both handle and non-handle subclasses. This may allow a single implementation in place of two almost identical ones (which, e.g., may reduce code and application programming interface (API) duplication). Additionally, based on the implications of handle subclasses, a class author may define a base class that is not explicitly compatible with handle subclasses (e.g., the handle compatible HANDLECOMPATIBLE attribute is set to false).

A handle-compatible class may be restricted such that it may not define a superclass that is not a handle-compatible class. Further, defining a class as handle-compatible may be done by, for example, deriving the class from a handle class or explicitly setting the HANDLECOMPATIBLE attribute to true. Allowing a handle-compatible class to be derived from another handle-compatible class may enable class authors to combine collections of behaviors into single named constructs. However, allowing a handle-compatible class to be derived from a non-handle-compatible class may provide a means of circumventing the explicit decision by the superclass developer not to be handle-compatible. Furthermore, handle-compatible class methods may be implemented with an awareness of the handle nature of inputted objects. If an object is passed with different handle nature than intended an error condition may be reported (e.g., an error message to be displayed, an exception condition to occur)

A programming environment may require that a class, whose HANDLECOMPATIBLE attribute is set to false, not be allowed to be derived from a superclass that is also a handle class. Violations of this rule may cause an error condition to be reported.

A class that does not have its HANDLECOMPATIBLE attribute set to true, may be a handle class if any of its superclasses are handle classes, and may be a value class if all superclasses are not handle classes. Here, an error condition may be reported if a developer attempts to combine handle classes with classes that are not handle-compatible.

Figure 3:
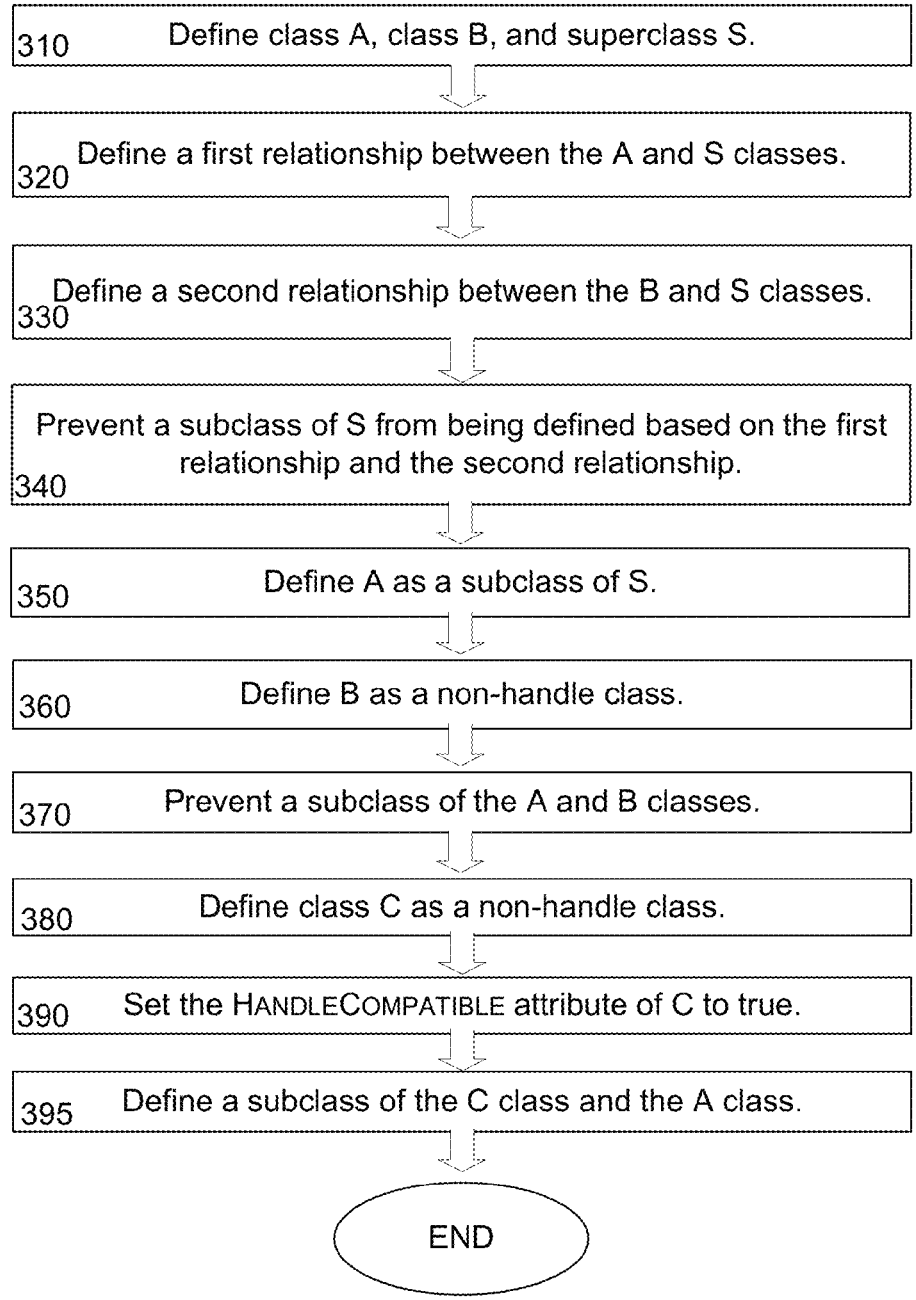
FIG. 3 illustrates an example flowchart describing processing that may be performed by a class relationship monitor to prevent subclasses based on class relationships.

FIG. 3 illustrates an example flowchart 300 of acts that may be used to prevent subclasses based on class relationships. Some or all of the acts may be performed by class relationship monitor 140. Referring to FIG. 3, in block 310, classes A and B may be defined along with superclass S. Classes A and B and superclass S may be part of classes 110.

In block 320, a first relationship may be defined between the A class and the S superclass. The first relationship may be part of class relationships 130.

In block 330, a second relationship may be defined between the B class and the S superclass. The second relationship may be part of class relationships 130.

In block 340, a subclass of S may be prevented from being defined based on the first relationship and the second relationship (block 340). Class relationship monitor 140 may prevent a subclass of S from being defined based on the defined relationships.

An example where a subclass of S may be prevented from being defined based on a first relationship and a second relationship may occur when A is a subclass of S and B is not compatible with S. Then C, an indirect subclass of S, may not be defined as a subclass of both A and B.

In block 350, class A may be defined as a subclass of superclass S.

In block 360, class B may be defined as a non-handle class.

In block 370, a subclass of A and B may be prevented from being defined. This block may be based on, for example, superclass S being a handle class and class B being defined as a non-handle class. Class relationship monitor 140 may prevent a subclass of A and B from being defined based on the defined relationships.

In block 380, class C may be defined as a non-handle class (block 380). Class C may be part of classes 110. Class C may subclass non-handle classes and may, therefore, be defined as a non-handle class.

In block 390, class C may have, for example, the HANDLECOMPATIBLE attribute set to true. Setting the HANDLECOMPATIBLE attribute set to true for class C may define class C as a handle-compatible class.

In block 395, a subclass of both A and C may be defined. This block may be based on class A being a handle or handle-compatible and class C having the HANDLECOMPATIBLE attribute set to true. Class relationship monitor 140 may allow a subclass of class A and class C to be defined based on the defined relationships.

Figure 4:
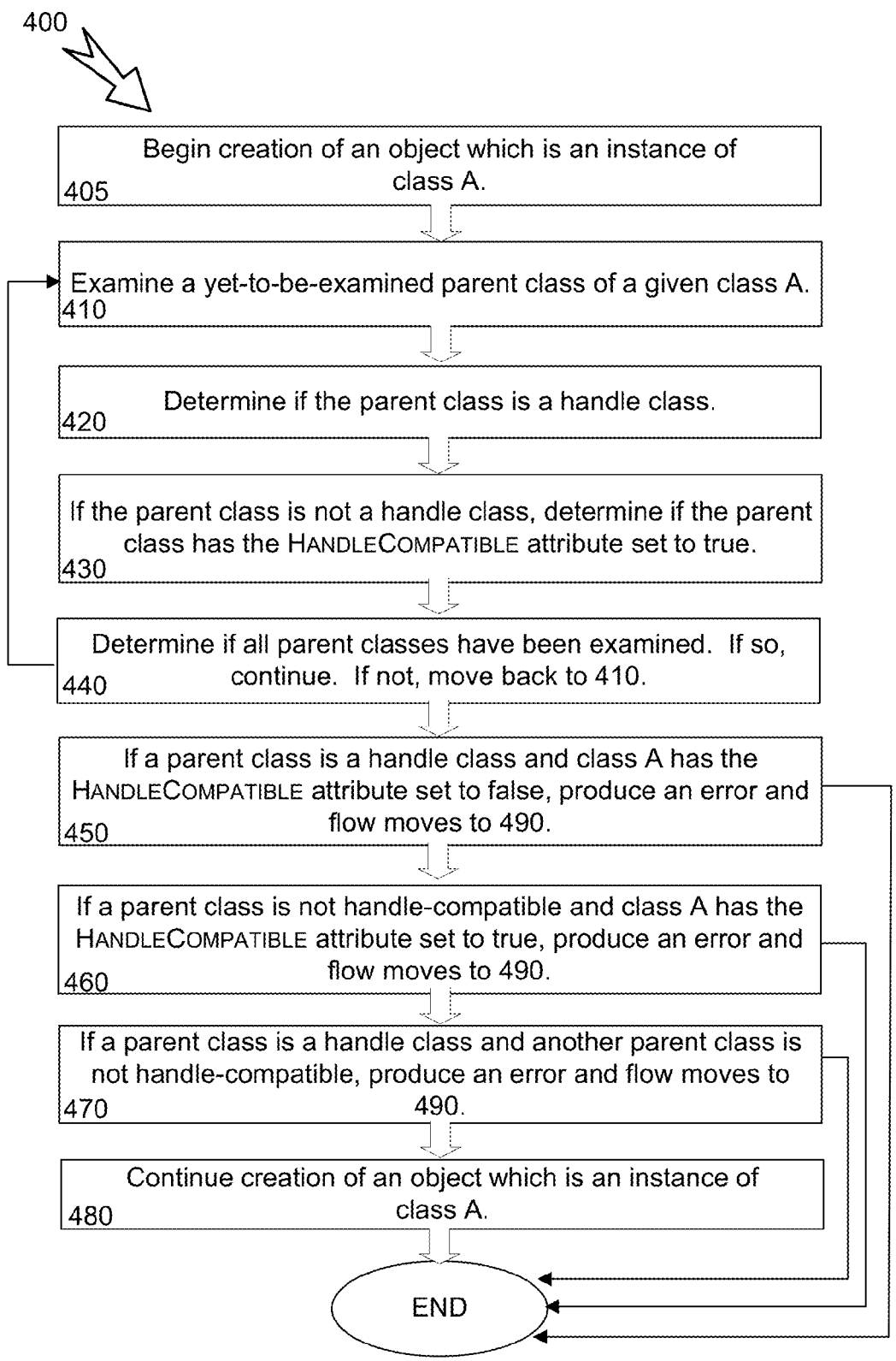
FIG. 4 illustrates an example flowchart describing processing that may be performed by a class relationship monitor to enforce handle-compatible rules.

FIG. 4 illustrates an example flowchart 400 of acts that may be used to enforce handle-compatible rules. Some or all of the acts may be performed by class relationship monitor 140. Enforcement of the handle-compatible rules may take place when creating an object which is an instance of the class.

Referring to FIG. 4, an object may begin to be created which is an instance of class A (block 405). Class A may have one or more parent classes. Class A and the parent classes may be part of classes 110. Additionally, one or more parent classes may be part of class lists 120.

At block 410, a parent class of class A may be examined.

At block 420, a check may be performed to determine whether the parent class is a handle class.

At block 430, if the parent is not a handle class, a check may be performed to determine whether the parent class has a HANDLECOMPATIBLE attribute set to true. At block 440, a check may be performed to determine whether all of the parent classes have been examined. If all the parent classes have not been examined, control may return to block 410 to examine a parent class that has not yet been examined.

At block 450, a check may be performed to determine whether a parent class is a handle class and whether class A has the HANDLECOMPATIBLE attribute set to false. If a parent class is a handle class and class A has the HANDLECOMPATIBLE attribute set to false, then an error may be produced and flow may end.

At block 460, a check may be performed to determine whether a parent class is not handle-compatible and whether class A has the HANDLECOMPATIBLE attribute set to true. If a parent class is not handle-compatible and class A has the HANDLECOMPATIBLE attribute set to true, then an error may be produced and flow may end.

At block 470, a check may be performed to determine whether a parent class is a handle class and whether another parent class is not handle-compatible. If a parent class is a handle class and another parent class is not handle-compatible, then an error may be produced and flow may end.

In block 480, if no error has occurred, then continue with creating the object which is an instance of class A.

In an example embodiment of the invention, the following utility class may be combined with handle classes when implemented by subclasses. As the below utility class does not explicitly subclass handle it may be considered a value class. The following code sample may be used in implementing FIG. 3, block 310 and/or FIG. 4, block 410.

classdef (HandleCompatible) Utility
    % Utility A handle-compatible utility class
      . . .
    end In the following example, a non-handle utility class may be combined with handle classes. Here, class UtilConsumer may be a subclass of handle classes (e.g., dynamicprops and hgsetget as defined in MATLAB software, for example) and may also subclass the previously mentioned, handle-compatible Utility class. The following code sample may be used in implementing FIG. 3, blocks 310 and 320 and/or FIG. 4, block 410.

classdef UtilConsumer<dynamicprops & hgsetget & Utility
    % UtilConsumer is-a handle
      . . .
    end In another example, a non-handle subclass of a handle-compatible class may be created. In the following example, class ValueConsumer may subclass non-handle classes (e.g., Utility and MException as defined in MATLAB software, for example) and, therefore, ValueConsumer may be a non-handle class. The following code sample may be used in implementing FIG. 3, block 310 and 320 and/or FIG. 4, block 410.

```
classdef ValueConsumer<MException & Utility
% ValueConsumer is not a handle class
    . . .
end
```

In the above code example, although Utility is designated handle-compatible, MException is not explicitly designated handle-compatible and is not a subclass of a handle class. Therefore, an error may be produced if a handle class is included in the list of superclasses as in FIG. 3, block 340 and/or FIG. 4, block 470.

In another example, an error may be produced when superclasses are combined incorrectly. In the following example, three superclasses are specified, one of which is explicitly defined as handle-compatible (i.e., Utility), one of which is derived from handle (e.g., hgsetget), and the third is not handle-compatible (e.g., MException, a value class not explicitly designated as handle-compatible). In the following example, attempting to create an object which is an instance of class Z may produce an error as in FIG. 4, block 470.

```
classdef Z<Utility & MException & hgsetget
% This is an error. Z's non-handle-compatible
superclasses include
% both handle and non-handle classes.
    . . .
end
```

A class with its HANDLECOMPATIBLE attribute explicitly set to true may make the class a handle-compatible class. While, a class with its HANDLECOMPATIBLE attribute explicitly set to false may signal that the class is not compatible with handle classes and therefore must not have any handle classes among its superclasses. The following examples demonstrate both correct and incorrect uses of the HANDLECOMPATIBLE attribute and the result.

The following example demonstrates setting the HANDLECOMPATIBLE attribute to true for two classes.

```
classdef (HandleCompatible) Utility
% Utility A utility class that can be combined with
% both handle and non-handle classes, but is itself not
% a handle.
    . . .
end
classdef (HandleCompatible) SpecializedUtility<Utility
% SpecializedUtility Further specialization of existing
% Utility class
    . . .
end
```

In the above example, the Utility and SpecializedUtility classes are identified as handle-compatible utility classes.

The following example demonstrates explicitly setting the HANDLECOMPATIBLE attribute to false for two classes.

```
classdef (~HandleCompatible) MyClass
% MyClass A simple value class.
    . . .
end
classdef (~HandleCompatible) UtilConsumer<Utility
% UtilConsumer A value class that subclasses a utility
% but is not itself a handle-compatible utility.
    . . .
``` end
Invalid combinations may produce an error. The following two code examples illustrate potentially invalid combinations. Here, class BadClass has been designated as not compatible with handles but has also defined handle as a superclass. Attempting to create an object which is an instance of BadClass may produce an error as in FIG. 4, block 450.

```
classdef (~HandleCompatible) BadClass<handle
% BadClass A non-handle-compatible class that is
% attempting to subclass handle.
    . . .
end
```

In another example, an error may be produced when a class has its HANDLECOMPATIBLE attribute is set to true but not all superclasses of the class are handle-compatible. Here, AnotherBadClass has its HANDLECOMPATIBLE attribute is set to true but its parent class MException is not handle-compatible. Attempting to create an object which is an instance of AnotherBadClass may produce an error as in, FIG. 4, block 460.

```
classdef                    (HandleCompatible)
    AnotherBadClass<MException
% AnotherBadClass is handle-compatible but MException
    tion is
% not handle-compatible
    . . .
end
```

(2) Identifying a Set of Allowable Subclasses

In another type of class inheritance control, an allowed subclasses (ALLOWEDSUBCLASSES) attribute may be associated with a class to allow class authors to identify classes 110 that may be permitted to subclass a particular class. The ALLOWEDSUBCLASSES attribute may accept a class list 120 to identify the allowed subclasses.

The ALLOWEDSUBCLASSES attribute may allow a class author to control how the class may be re-used and may prevent undesirable subclassing. This may lead to a simpler design as the class author may not need to choose between encapsulation and the benefits of separating code into, for example, a helper class or function.

In an example embodiment, a class without the ALLOWEDSUBCLASSES attribute may place no restrictions on the ability of other classes to subclass it. A class with its ALLOWEDSUBCLASSES list explicitly set to empty may be declaring itself to be a sealed class and no class may be permitted to subclass it. A class with a list of classes in its ALLOWEDSUBCLASSES list does not place a requirement on the included subclasses that they must be derived from the given class.

An example syntax may be:
classdef(AllowedSubclasses=List) mySuperClass
end

Where List may be a list of allowed subclasses and mySuperClass is the class being defined.

The ALLOWEDSUBCLASSES attribute may have the following features. A class with the ALLOWEDSUBCLASSES attribute not set may be freely subclassed. A class with ALLOWEDSUBCLASSES set to { } may allow no subclasses. For example, inclusion of a class into the list of allowed subclasses of a parent class may grant permission to subclass the parent class (e.g., mySuperClass), but does not indicate that the listed classes are actual subclasses or require them to be defined as subclasses of the parent class (e.g., mySuperClass). Any class not in the list of allowed subclasses may not declare the parent class (e.g., mySuperClass) as a superclass. Whether an allowed subclass can be further subclassed may be determined by that subclass and may not be controlled by the list in the parent class (e.g., mySuperClass). If a class in the list cannot be found at the time the parent class (e.g., mySuperClass) is parsed, for example, then that class may be dropped from the list of allowed subclasses.

A class with an ALLOWEDSUBCLASSES attribute may allow the class to make a declaration governing classes that may or may not be installed because they may be contained in products that have not, for example, been licensed.

An example usage may be:
classdef (AllowedSubclasses={?mySubA, ?mySubB, ?mySubC}) mySuperClass
end In the above example, class mySuperClass may allow only classes mySubA, mySubB and mySubC to subclass mySuperClass. If mySubA, mySubB and mySubC are sealed, then this may create a sealed hierarchy.

Thus, using an ALLOWEDSUBCLASSES attribute a class author may specify how a class may be re-used and undesirable subclassing of classes may be prevented and a sealed class hierarchy may be created.

Figure 5:
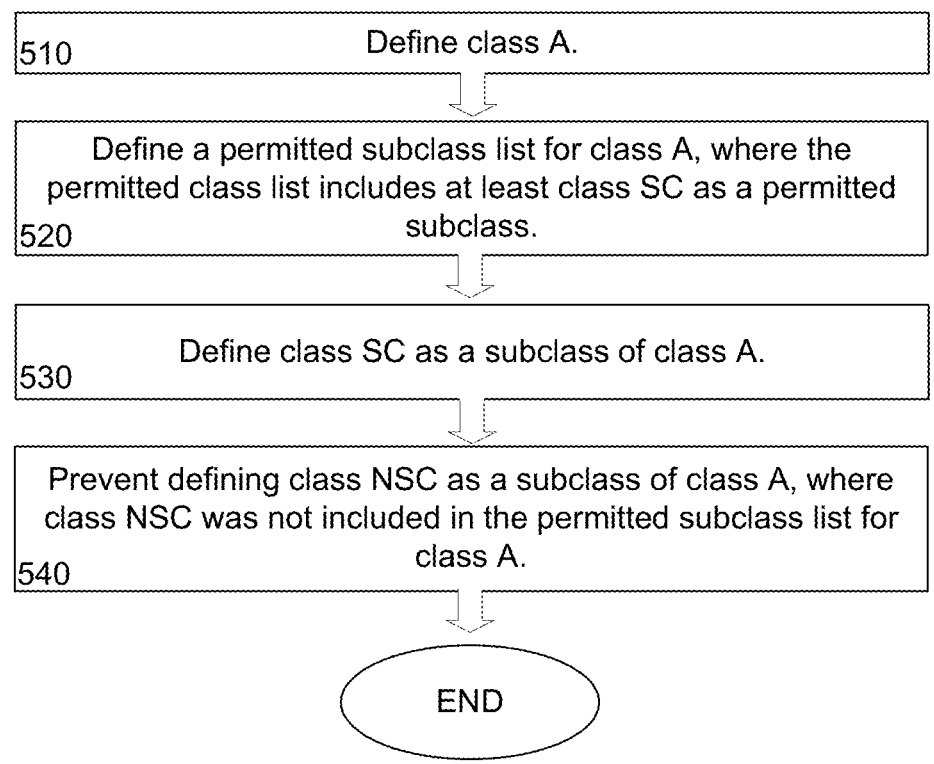
FIG. 5 illustrates an example flowchart describing processing that may be performed by a class relationship monitor to enforce subclasses from an allowable set of classes.

FIG. 5 illustrates an example flowchart 500 of acts that may be used to enforce subclasses from an allowable set of classes. Some or all of the acts may be performed by class relationship monitor 140.

Referring to FIG. 5, in block 510, class A may be defined. Class A may be part of classes 110.

In block 520, a permitted subclass list for class A may be defined. The permitted subclass list may include class SC as a permitted subclass. The permitted subclass list may be part of class lists 120.

In block 530, class SC may be defined as a subclass of class A.

In block 540, class NSC may be prevented from being defined as a subclass of A. Class NSC was not listed in the permitted subclass list of class A.

Figure 6:
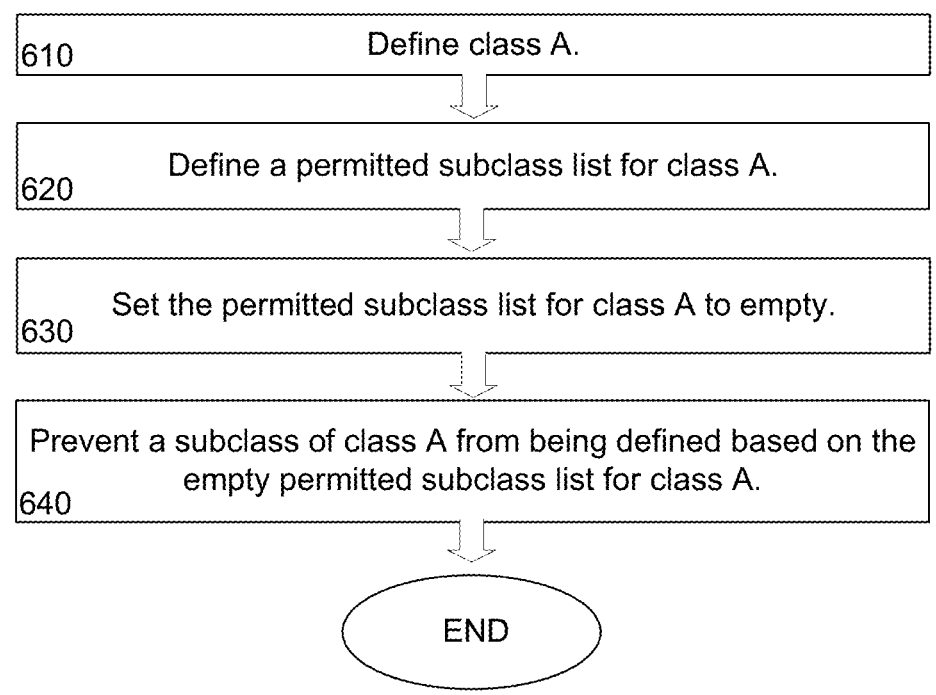
FIG. 6 illustrates an example flowchart describing processing that may be performed by a relationship monitor to enforce a sealed class.

FIG. 6 illustrates an example flowchart 600 of acts that may be used to enforce a sealed class. Some or all of the acts may be performed by class relationship monitor 140.

Referring to FIG. 6, in block 610, class A may be defined. Class A may be part of classes 110.

In block 620, a permitted subclass list may be defined for class A. The permitted subclass list may be part of class lists 120.

In block 630, the permitted subclass list for class A may be set to empty.

In block 640, subclasses of class A may be prevented from being defined based on the empty permitted subclass list for class A.

(3) Disallowing a Specific Class from being Subclassed by a Given Class

In programming environment 100, the use of a negation operator (e.g., "~") may be used in a class definition as an inheritance control to establish a class relationship 120. For example the negation operator may indicate that the class being defined is not combinable (e.g., mutually exclusive) with the negated class. Both the class being defined and the negated class may be part of classes 110. Where specifying a superclass may establish an is-a relationship, the use of exclusion may specify a not-a relationship. The ability to explicitly exclude a given class from being derived from the negated class may enable a class author to, for example, opt out of certain behaviors.

As with the is-a relationship, the not-a relationship may extend to subclasses of the given class. Any class that subclasses the given class will be excluded from also subclassing the negated class.

Figure 7:
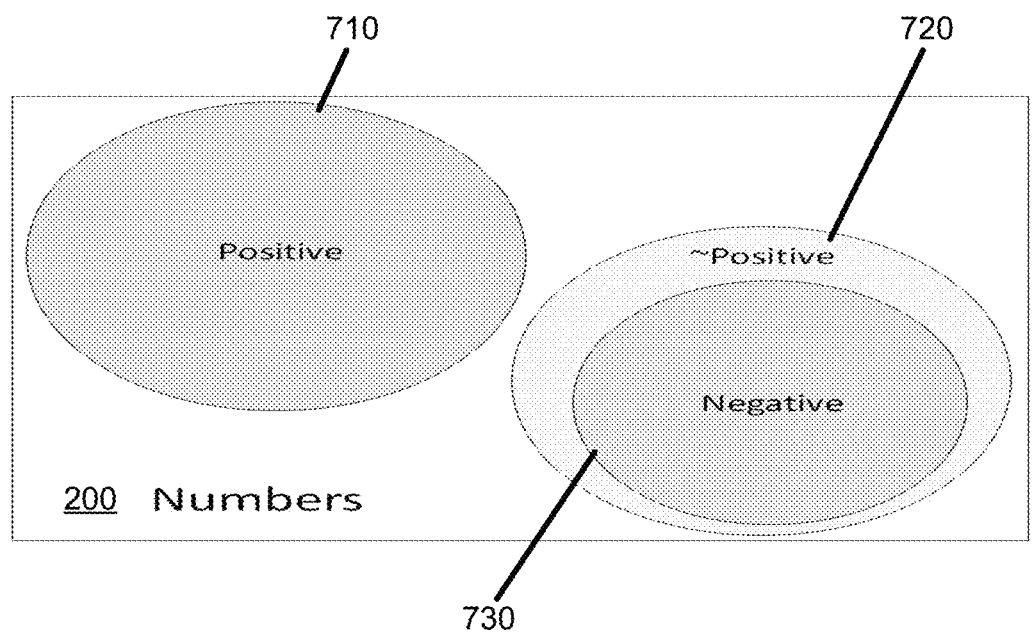
FIG. 7 illustrates a Venn diagram depicting an example of class relationships of mutual exclusion in an embodiment of the invention.

FIG. 7 illustrates a Venn diagram depicting an example of class relationships 130 of mutual exclusion between various example classes 110 in an embodiment of the invention. Referring to FIG. 7, the example classes 110 include a class of all numbers 200, a class of positive numbers 710, a class of not positive numbers 720, and a class of negative numbers 730. As illustrated, the class of positive numbers 710 and class of not positive numbers 720 exist within the class of all numbers 200 and the class of negative numbers 730 exist within the class of not positive numbers. Thus, the negative numbers class 730, may subclass from a class defined as not positive numbers 720. However, the negative numbers class 730 may not subclass from the positive numbers class 710. Using "~," for example, during the definition of the negative numbers 730 class, may indicate that the negative numbers class 730 may not be combined with the positive numbers class 710.

Figure 8:
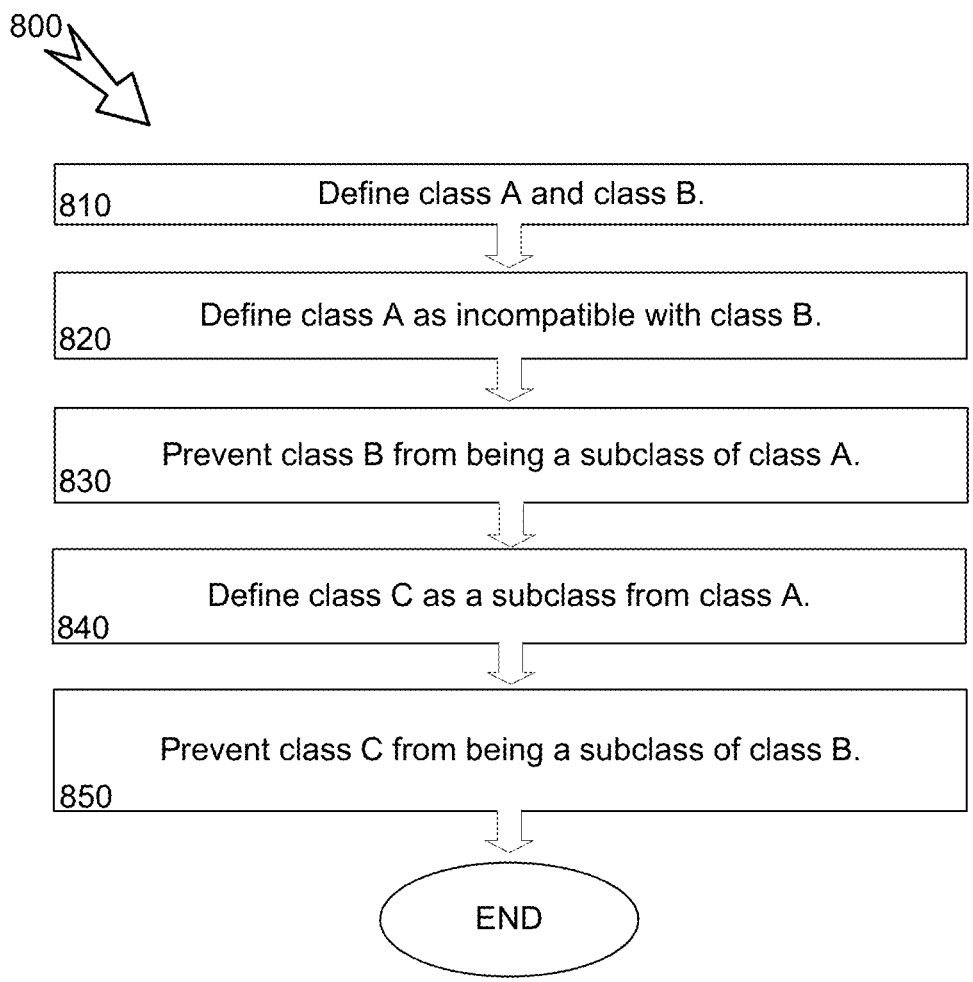
FIG. 8 illustrates an example flowchart describing processing that may be performed by a class relationship monitor to prevent a specific class from being subclassed by a given class.

FIG. 8 illustrates an example flowchart 800 of acts that may be used to prevent a specific class from being subclassed by a given class. Some or all of the acts may be performed by class relationship monitor 140.

Referring to FIG. 8, in block 810, classes A and B may be defined. Classes A and B may be part of classes 110.

In block 820, class A may be defined as being incompatible with class B. Where, class A being defined as being incompatible may be part of class relationships 130.

In block 830, class B may be prevented from being a subclass of class A. Class relationship monitor 140 may prevent class B from being a subclass of class A.

In block 840, class C may be defined as a subclass of class A. Class C may be part of classes 110.

In block 850, class C may be prevented from being a subclass of class B. As class C is a subclass from class A, the restriction placed on class A may be inherited by class C. Class C may be incompatible with class B. Class relationship monitor 140 may prevent class C from being a subclass of class B.

(4) Selecting a Specified Number of Classes from a Fixed Class List

In an example embodiment of the invention, a specific number of superclasses may be specified as being drawn from a fixed set of classes. Using this class inheritance control may enable a class author to associate groups of behaviors with a given class. This may represent, for example, partitioning an existing class set into non-empty and non-overlapping class subsets.

Figure 9:
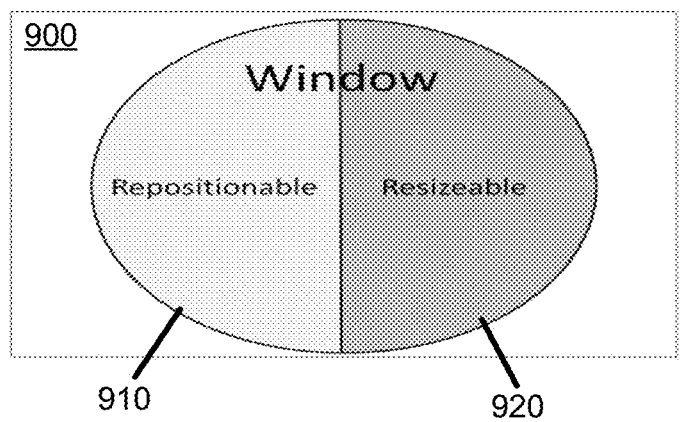
FIG. 9 illustrates an example set partition in an embodiment of the invention.

FIG. 9 illustrates an example set partition depicting an example of class relationships 130 between various example classes in an embodiment of the invention. Referring to FIG. 9, the example classes 110 include a Window class 900, a Repositionable class 910 and a Resizeable class 920. As illustrated, the Repositionable class 910 and the Resizeable class 920 may exist within the window class 900.

In an embodiment of the invention, a class that subclasses the Sindow class 900 must also subclass either Repositionable 910 or Resizeable 920. Here, the author of the Window class 900 may wish to constrain its subclasses to be one of Repositionable 910 or Resizeable 920, but not both. This may be expanded to include, for example, a set of classes 110 or class lists 120 to choose from.

Figure 10:
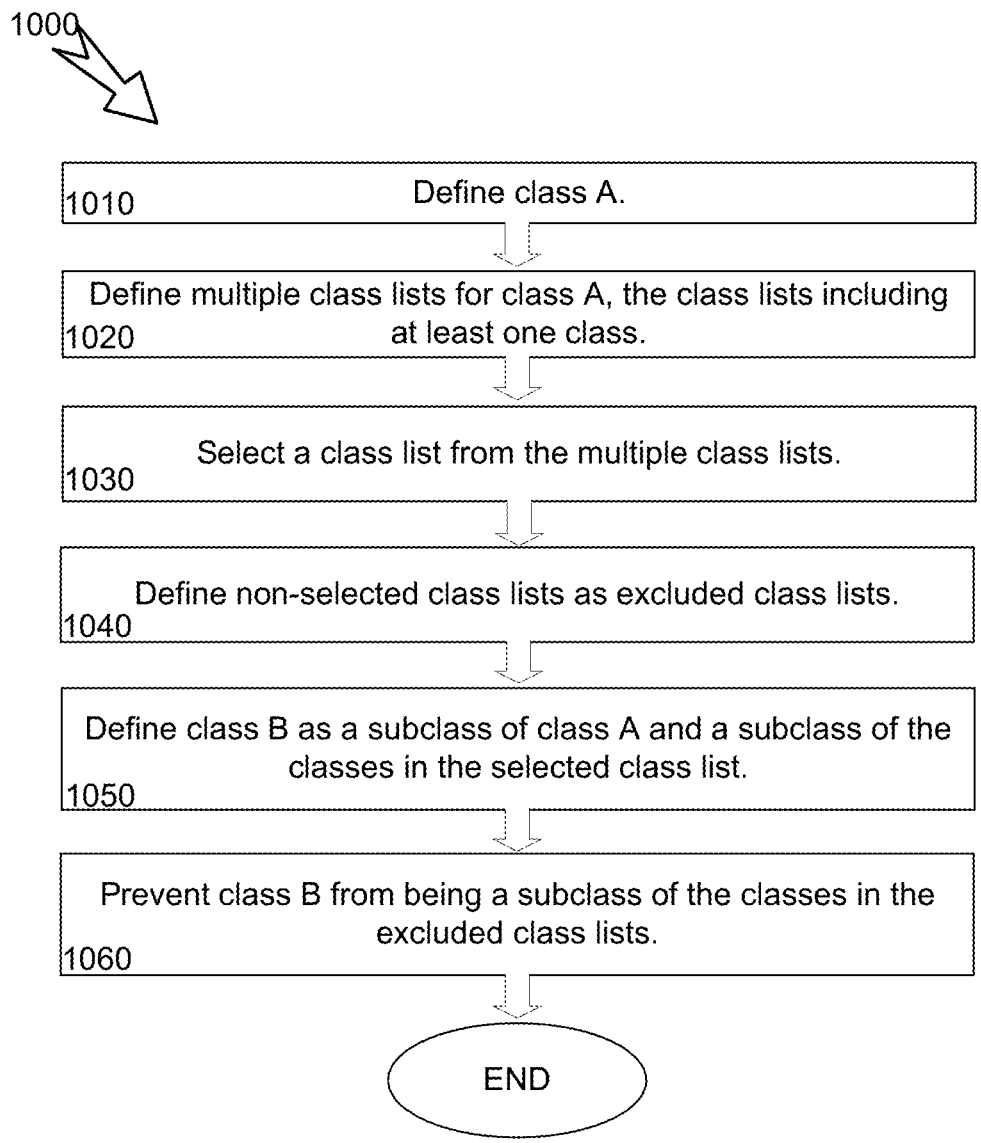
FIG. 10 illustrates an example flowchart describing processing that may be performed by a class relationship monitor to select a specified number of classes from a given class list.

The ALLOWEDSUBCLASSES attribute and exclusion feature, both described above, may be leveraged as in the following example.
classdef (AllowedSubclasses={?Repositionable, ?Resizeable}) Window
classdef Repositionable<~Resizeable
classdef Resizeable<~Repositionable FIG. 10 illustrates an example flowchart 1000 of acts that may be used to select a specified number of classes from a given class list 120. Some or all of the acts may be performed by class relationship monitor 140.

Referring to FIG. 10, in block 1010, class A may be defined. Class A may be part of classes 110.

In block 1020, multiple class lists 120 for class A may be defined. The class lists of class A may include at least one class.

In block 1030, a class list from the multiple class lists 120 may be selected.

In block 1040, the non-selected class lists as the excluded class lists may be defined.

In block 1050, class B as a subclass of class A and as a subclass of the class or classes listed in the selected class list may be defined. The relationship of class B to class A and the selected class list may be part of class relationships 130.

In block 1060, class B may be prevented from being a subclass of the class or classes listed in the excluded class lists. Class relationship monitor 140 may prevent class B from being a subclass of classes listed in the excluded class lists.

(5) Selecting at Least a Specified Number of Classes from a Fixed Class List

In an example embodiment, a minimum number of specified classes may be drawn from a fixed set of classes. This class inheritance control may enable a class author to associate behaviors that are not exclusive of one another but at least one of which is necessary. This may represent a union relationship, where from a specified set of superclasses, some minimum number of superclasses is selected.

Figure 11:
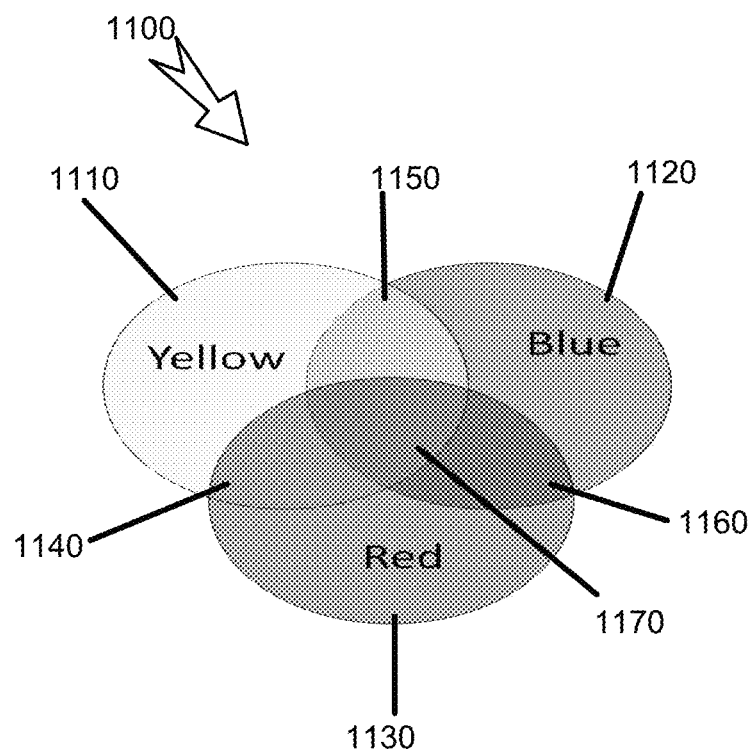
FIG. 11 illustrates an example selection of one or more colors from a specified set in an embodiment of the invention.

FIG. 11 illustrates an example selection of one or more colors from a specified set 1100 depicting example class relationships 130 in an embodiment of the invention. FIG. 11 may represent, for example, a set of pigments used to formulate paint. For a given paint color, one or more of the three primary colors may be utilized, red, blue, or yellow. In this case, at least one primary color may be required.

Referring to FIG. 11, the example classes 110 may include a yellow class 1110, a blue class 1120, and a red class 1130. Here, a valid paint color can fall anywhere within the diagram 1100. Additionally, the combination of the yellow class 1110 and the blue class 1120 may the yield green class 1150, the combination of the yellow class 1110 and the red class 1130 may yield the orange class 1140, the combination of the red class 1130 and the blue class 1120 may yield the purple class 1160. Finally, the combination of the red class 1130, the yellow class 1110, and the blue class 1120 may yield class 1170. Here, a class author may wish to specify that at least one of the yellow class 1110, the blue class 1120, or the red class 1130 is required. A class list 120 that includes the yellow class 1110, the blue class 1120, and the red class 1130, may also implicitly include the orange class 1140, the green class 1150, the purple class 1160 and class 1170.

The pipe operator ("|"), used in many programming environments 100 to represent the OR operation, may be used to specify at least a number of classes from a fixed set. For example, classdef PaintColor<(Red|Blue|Yellow)

Figure 12:
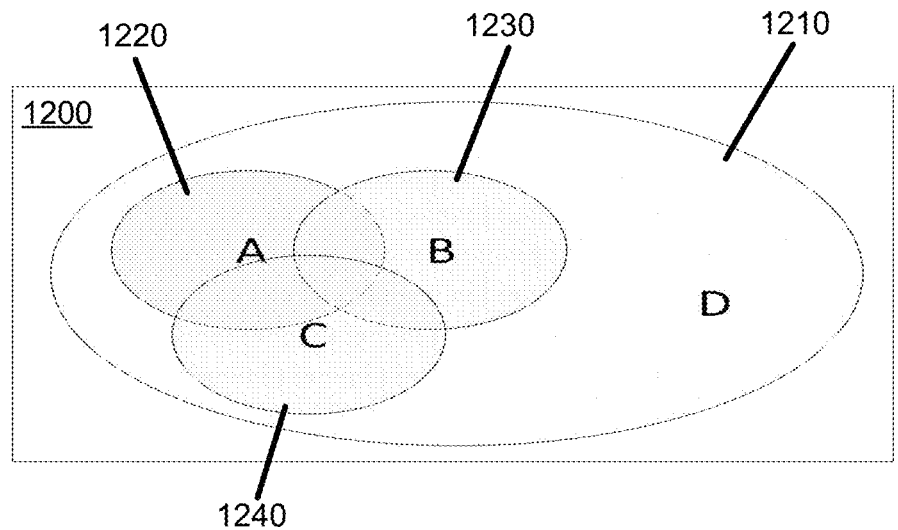
FIG. 12 illustrates an example selection of zero or more classes from a specified set of classes in an embodiment of the invention.

FIG. 12 illustrates an example of class relationships 130 of selection of zero or more classes 110 from a specified class list 120 in an embodiment of the invention. Referring to FIG. 12, a class set 1200 may include a class D 1110, a class A 1120, a class B 1130, and a class C 1140. As illustrated, members of the class D 1110 may also be part of one or more of the class A 1120, the class B 1130, and the class C 1140, for example. In such an example embodiment, the minimum number of required classes may be zero.

Figure 13:
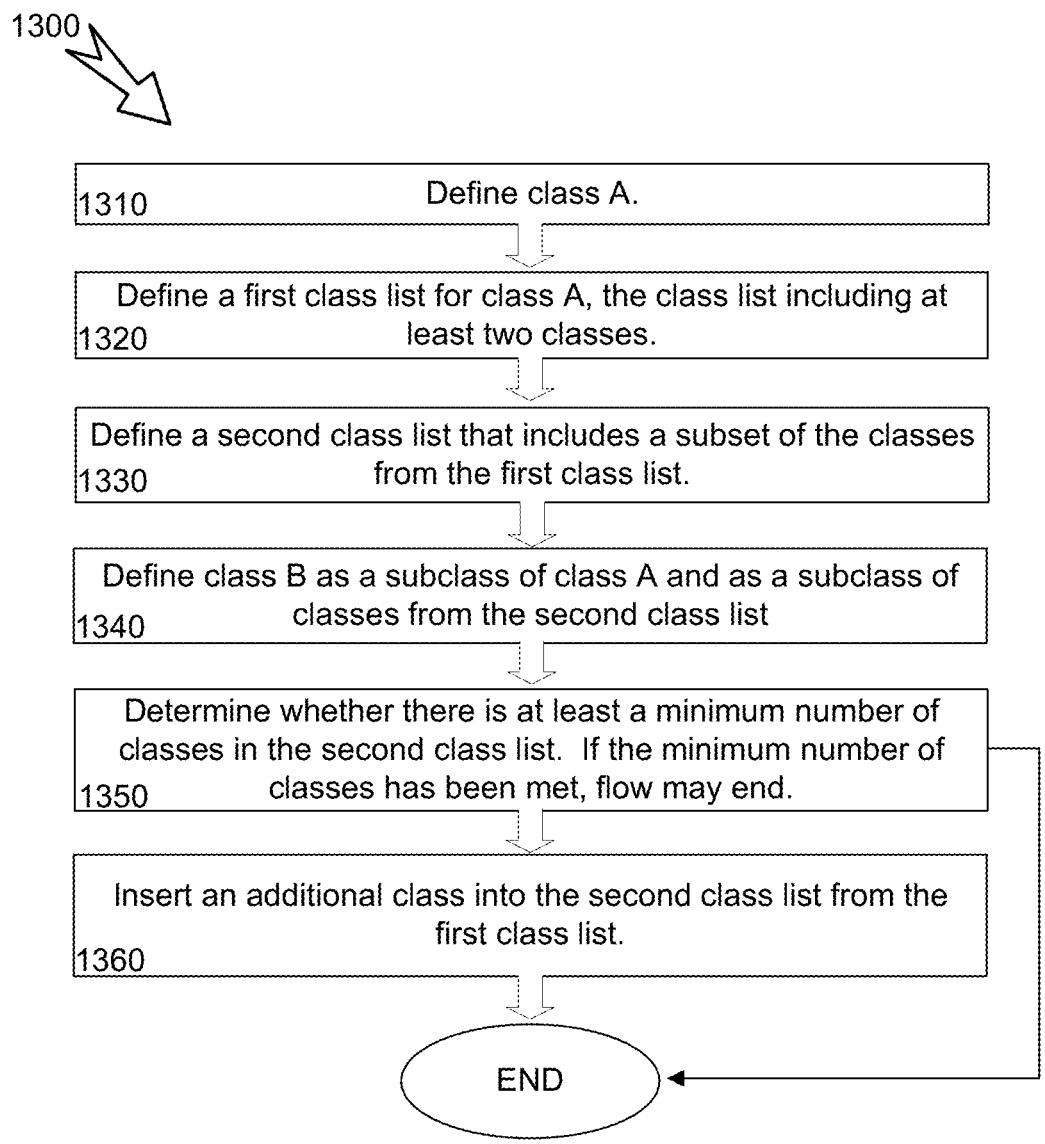
FIG. 13 illustrates an example flowchart describing processing that may be performed by a class relationship monitor to select at least a specified number of classes from a fixed class list.

FIG. 13 illustrates an example flowchart 1300 of acts that may be used to select at least a specified number of classes from a fixed class list 120. Some or all of the acts may be performed by class relationship monitor 140. In block 1310, class A may be defined. Class A may be part of classes 110.

In block 1320, a first class list for class A may be defined. The first class list may include at least two classes. The first class list may be part of class lists 120.

In block 1330, a second class list may be defined. The second class list may include a subset of the classes from the first class list. The second class list may be part of class lists 120.

In block 1340, class B may be defined as a subclass from class A and as a subclass of the classes from the second class list. Class B may be part of classes 110. The definition of class B as a subclass from class A and as a subclass of the classes from the second class list may be part of class relationships 130.

In block 1350, a check of the second class list may be performed to determine whether there is at least a minimum number of classes in the second class list. If the minimum number of classes has been met, class relationship monitor 140 may allow the creating of an object which is an instance of class B and the function may end.

In block 1360, an additional class may be inserted into the second class list from the first class list. Here, if the second class list does not contain the required minimum number of classes, then additional classes may be added to the second class list from the first class list.

(6) Selecting at Most a Specified Number of Classes from a Fixed Class List

In another example embodiment, a maximum number of selected elements may be drawn from a fixed class list. This class inheritance control may enable a class author to associate optional behaviors.

Figure 14:
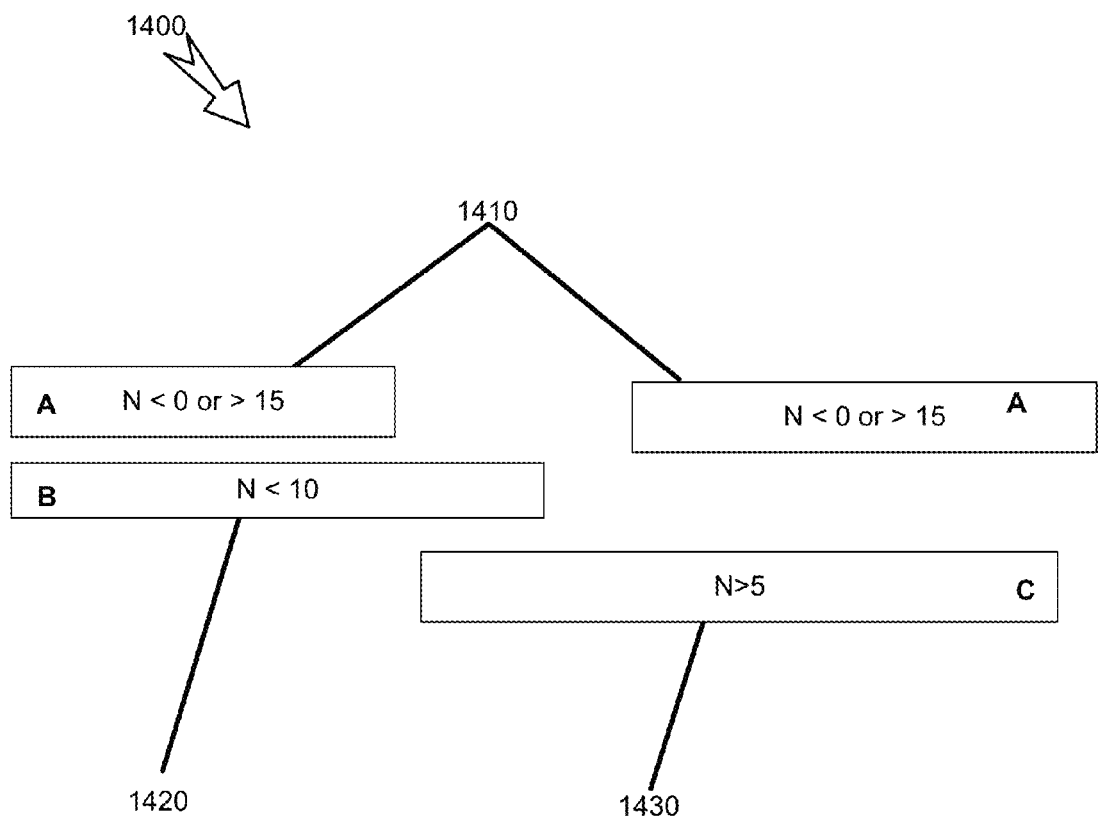
FIG. 14 illustrates example classes representing numbers in an embodiment of the invention.

FIG. 14 illustrates example classes 1400 representing numbers in an embodiment of the invention. Referring to FIG. 14, classes 1400 may include a class A 1410, a class B 1420, and a class C 1430. As illustrated, class C 1430 represents numbers greater than five. Class B 1420 represents numbers less than 10. Class A 1410 represents numbers less than zero and greater than 15. In such an example embodiment, each number may be an instance of the class A, B, and/or C. For example, the number six may be an instance of class B 1420 and class C 1430.

Figure 15:
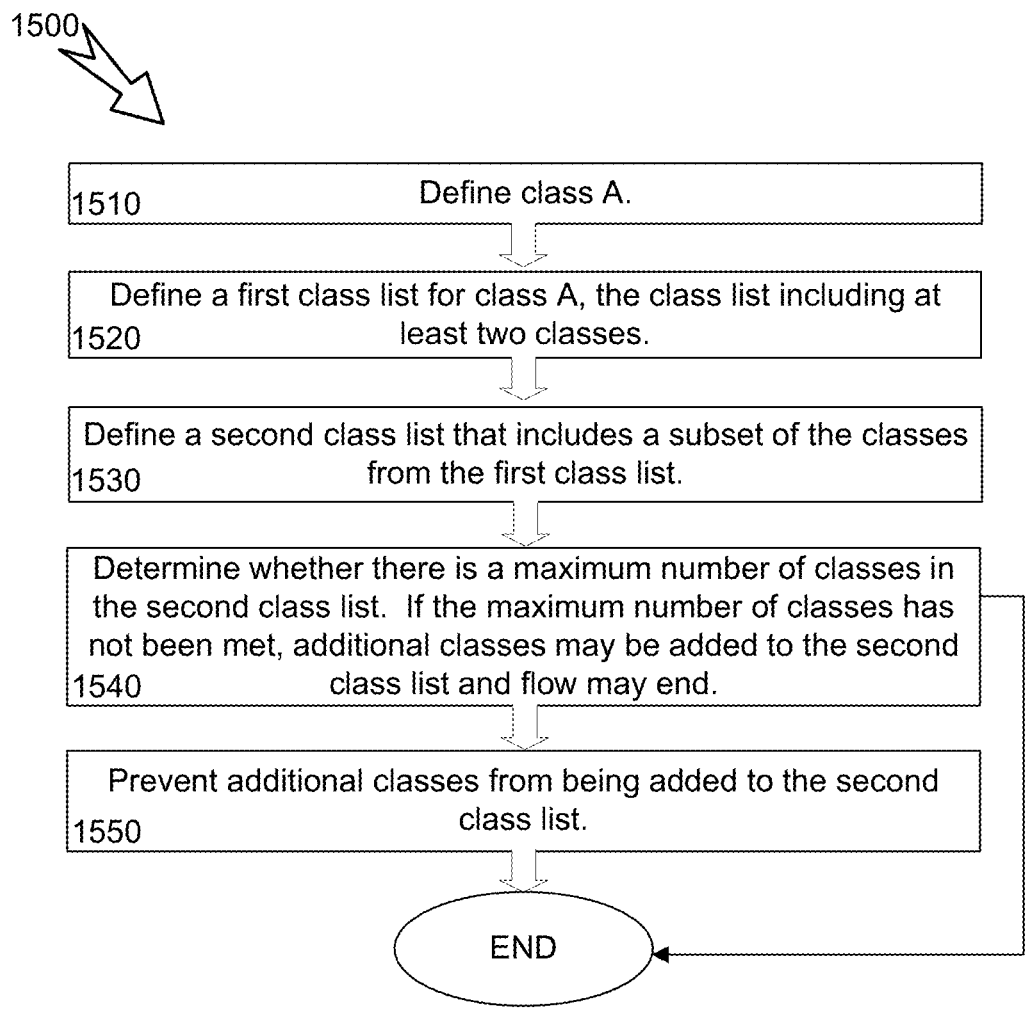
FIG. 15 illustrates an example flowchart describing processing that may be performed by a class relationship monitor to select at most a specified number of classes from a fixed class list.

FIG. 15 illustrates an example flowchart 1500 of acts that may be used to select at most a specified number of classes from a fixed class list. Some or all of the acts may be performed by class relationship monitor 140.

Referring to FIG. 15, in step 1510, class A may be defined. Class A may be part of classes 110.

In step 1520, a first class list for class A may be defined. The first class list may include at least two classes. The first class list may be part of class lists 120.

In step 1530, a second class list may be defined. The second class list may include a subset of the classes from the first class list. The second class list may be part of class lists 120.

In step 1540, a check of the second class list may be performed to determine whether there is a maximum number of classes in the second class list. If the maximum number of classes has not been met, then additional classes may be added to the second class list and flow may end.

In step 1550, additional classes may be prevented from being added to the second class list. In other words, if the second class list contains the maximum number of classes, no additional classes may be added. Class relationship monitor 140 may prevent additional classes from being added to the second class list.

(7) Combining Rules to Form Compound Expressions

Many languages may support multiple inheritance where a class has more than one parent class. Identifying a list of two or more superclasses may be considered as imposing multiple constraints. For example, the intersection of the instance space of all superclasses may define the subclass (e.g., FIG. 2).

With the introduction of additional types of class inheritance controls a logical extension of multiple inheritance may support compound expressions. Using the same syntax as may be already used for multiple inheritance, for example "&," a series of constraints may be applied to a given class.

In an example embodiment, referring back to FIG. 9, a class author may wish to indicate that a given class must be either Resizable 920 or Repositionable 910, and cannot be combined with FixedPosition items.

Figure 16:
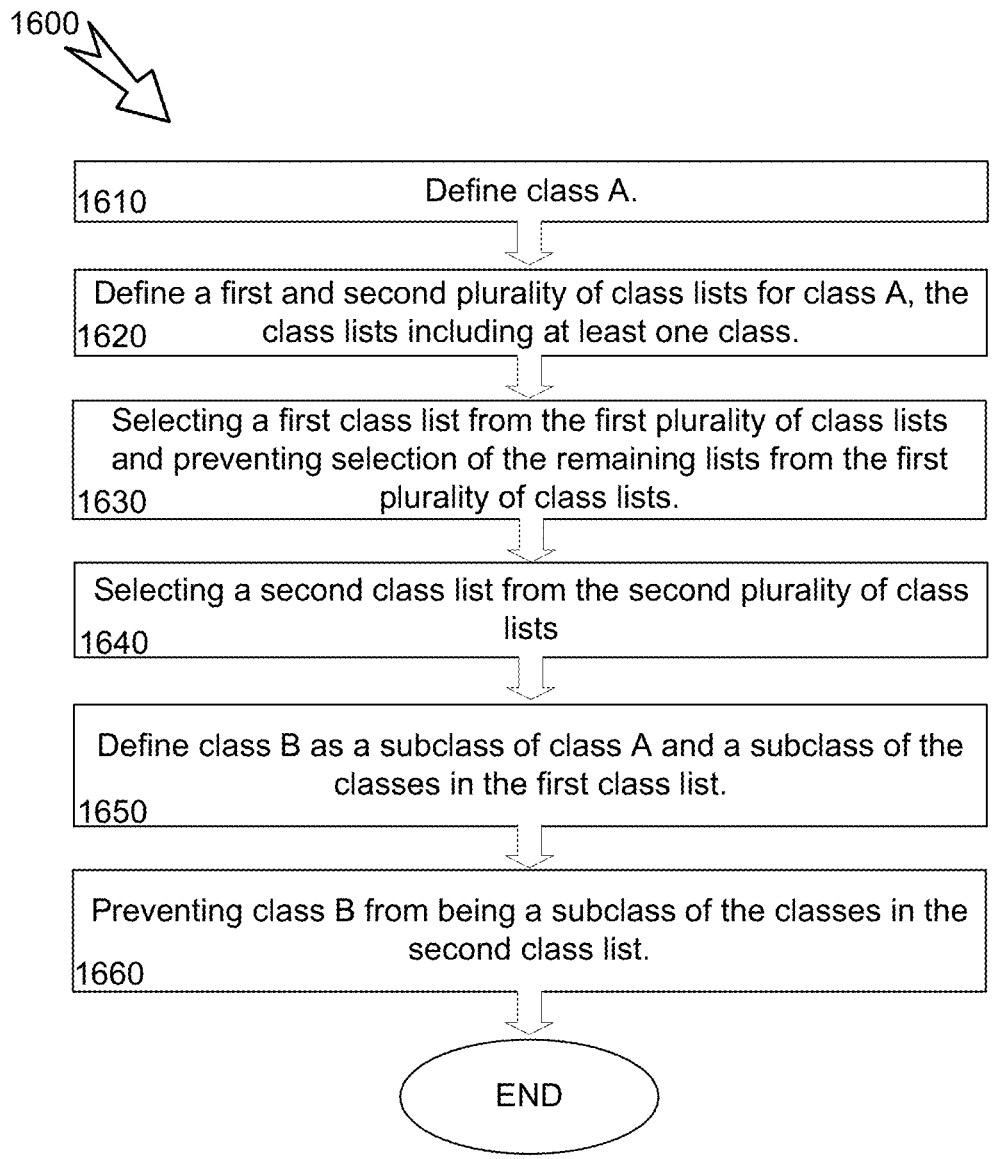
FIG. 16 illustrates an example flowchart describing processing that may be performed by a class relationship monitor when combining rules to form compound expressions.

FIG. 16 illustrates an example flowchart 1600 of acts that may be used to combine rules to form compound expressions. Some or all of the acts may be performed by class relationship monitor 140.

Referring to FIG. 16, in step 1610, class A may be defined. Class A may be part of classes 110.

In step 1620, a first and second plurality of class lists for class A may be defined. The class lists in the first and second plurality of class lists may be part of class lists 120 and may include at least one class 110. The class lists for class A may be part of class relationships 130.

In step 1630, a first class list may be selected from the first plurality of class lists. Selection of the remaining lists in the first plurality of class lists may be prevented. Class relationship monitor 140 may prevent selection of the remaining lists from the first plurality of class lists.

In step 1640, a second class list may be selected from the second plurality of class lists.

In step 1650, class B may be defined as a subclass of class A and a subclass of the classes in the first class list. The definition of class B may be part of class relationships 130.

In step 1660, class B may be prevented from being a subclass of the classes in the second class list. Class relationship monitor 140 may prevent class B from being a subclass of the classes in the second class list.

Example Embodiment Summary

In an embodiment of the invention, a system of constraints on inheritance relationships may provide class authors with the ability to dictate class behavior at a tight level of granularity. These types of controls may be useful in the development of highly configurable applications and those that require a high degree of robustness.

For example, software such as MATLAB® Code Analyzer®, can make use of the constraint information to provide more guidance to subclass authors by pointing out where constraints are violated. Additionally, software development tools such as tab completion may leverage this information to provide information to subclass authors.

Further, text-based programming environments and graphic-based programming environments may utilize the constraint information to provide structure and guidance to class authors.

Example Distributed System

Figure 17:
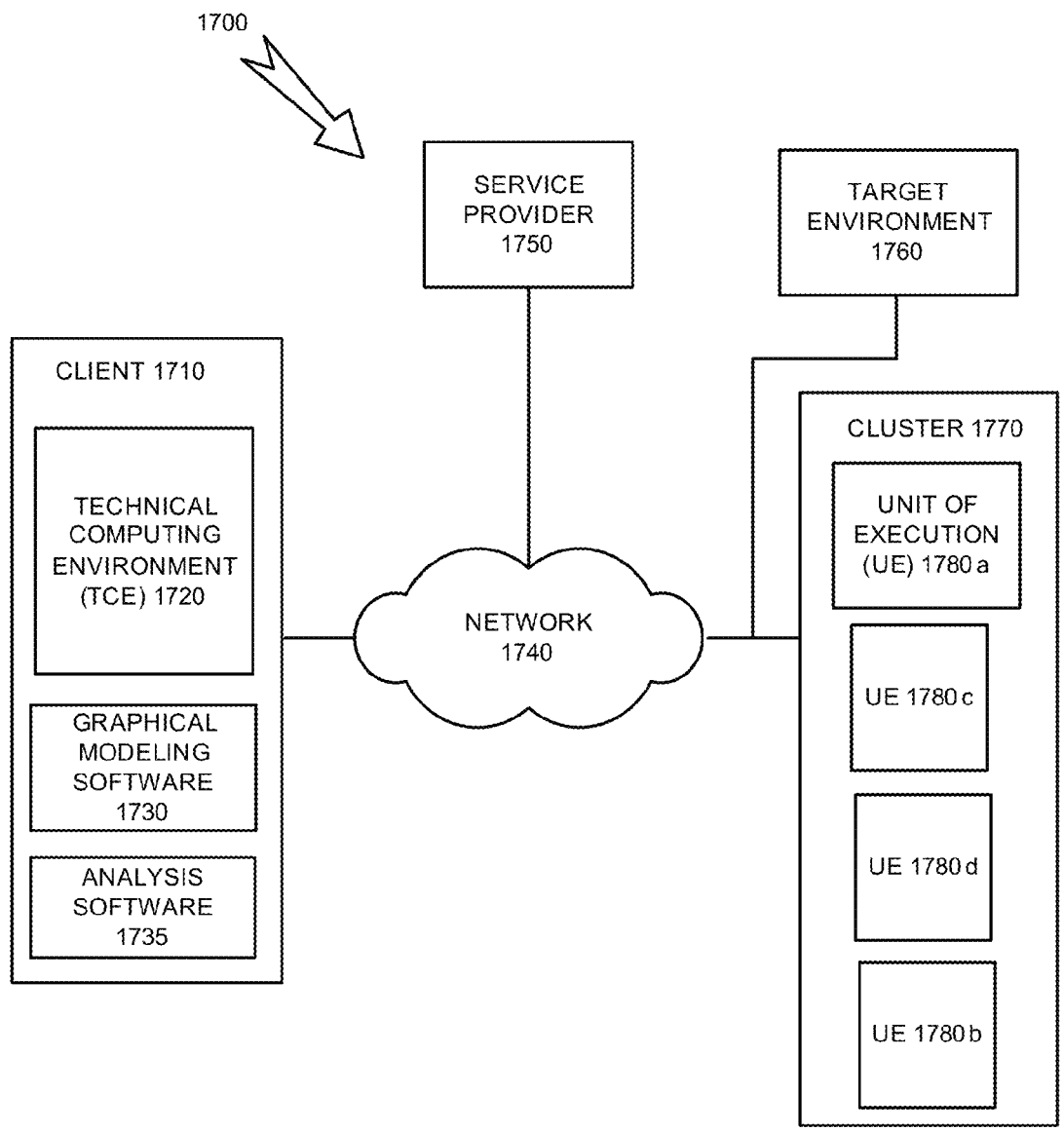
FIG. 17 illustrates an example distributed environment that may be used for practicing an embodiment of the invention.

FIG. 17 illustrates a distributed environment 1700 that may be configured to practice an embodiment of the invention. Referring to FIG. 17, environment 1700 may include a client 1710, network 1740, service provider 1750, target environment 1760 and cluster 1770. Note that the distributed environment illustrated in FIG. 17 is just one example of a distributed environment that may be used. Other distributed environments may include additional devices, fewer devices, or devices in arrangements that differ from the arrangement of environment 1700. For example, distributed environment 1700 can be implemented as a computing cloud if desired.

Client 1710, service provider 1750, and/or target environment 1760 may implement programming environment 100.

Client 1710 may include a device capable of sending and/or receiving information (e.g., data) to and/or from another device, such as target environment 1760. Information may include any type of machine-readable information having substantially any format that may be adapted for use, e.g., in one or more networks and/or with one or more devices. The information may include digital information and/or analog information. The information may further be packetized and/or non-packetized. In an embodiment, client 1710 may download data and/or code via network 1740. For example, client 1710 can download code for suggesting correct identifiers consistent with aspects of the invention.

Client 1710 may be, for example, a desktop computer, a laptop computer, a client computer, a server computer, a mainframe computer, a personal digital assistant (PDA), a web-enabled cellular telephone, a smart phone, a digital notepad, smart sensor/actuator, or another computation or communication device that executes instructions that enable the device to perform one or more activities and/or generate one or more results.

In an embodiment, client 1710 may include a technical computing environment (TCE) 1720, graphical modeling software 1730 and analysis software 1735. TCE 1720 may include a graphical block diagram environment that may be used to execute models and manipulate the models in accordance with techniques described herein. In other embodiments, client 1710 may include other components, applications, etc. Embodiments of TCE 1720 may contain computer-executable instructions (e.g., code) and data that are configured to implement the TCE. The instructions may include instructions configured to implement modeling software 1720 and/or graphical analysis software 1735. An example embodiment of one or more of the class inheritance controls provided by programming environment 100 may be implemented in a TCE 1720.

Modeling software 1730 and the analysis software 1735 may be graphical, textual or a hybrid that includes both textual and graphical capabilities/features. Modeling software 1730 may include computer-executable instructions that allow, e.g., a user to build and/or execute a model. For example, modeling software 1730 may allow a user to build and execute a time-based model, a state-based model, an event-based model, a dataflow-based model, etc. An example embodiment of the invention may be implemented as part of modeling software 1730.

Analysis software 1735 may include computer-executable instructions that allow information in a model to be evaluated. Evaluating a model may include generating tests for the model that satisfy model coverage objectives, user-defined objectives, etc. In addition, evaluating a model may include proving various model properties and generating examples of violations of these properties. Moreover, evaluating a model may include analyzing the model, in accordance with techniques described herein. In an embodiment of the invention, analysis software 1735 may include the Simulink® Design Verifier software which is available from The MathWorks, Inc. An example embodiment of the invention may be implemented as part of analysis software 1735.

Network 1740 may include any network capable of exchanging information between entities associated with the network, including, for example, client 1710, service provider 1750, target environment 1760 and cluster 1770. Exchanged information may include, for example, packet data and/or non-packet data. Implementations of network 1740 may include local area networks (LANs), metropolitan area networks (MANs), wide-area networks (WANs), etc. Information may be exchanged between entities using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

Network 1740 may include various network devices, such as, for example, routers, switches, firewalls, servers, etc. Portions of network 1740 may be wired (e.g., using wired conductors, optical fibers, etc.) and/or wireless (e.g., free-space optical (FSO), radio frequency (RF), acoustic transmission paths, etc.). Portions of network 1740 may include a substantially open public network, such as the Internet. Portions of network 1740 may include a more restricted network, such as a virtual private network (VPN). It should be noted that implementations of networks and/or devices operating on networks described herein are not limited with regards to information carried by the networks, protocols used in the networks, the architecture/configuration of the networks, etc.

Service provider 1750 may include code (e.g., software), logic (e.g., hardware or a combination of hardware and software), etc., that makes a service available to another device in distributed environment 1700. Service provider 1750 may include a server operated by an entity (e.g., an individual, a corporation, an educational institution, a government agency, etc.) that provides one or more services to a destination, such as client 1710. The services may include software containing computer-executable instructions that may be executed, in whole or in part, by a destination, by service provider 1750 on behalf of the destination, or some combination thereof. An example embodiment of the invention may be implemented as part of service provider 1750.

For example, in an embodiment, service provider 1750 may provide one or more subscription-based services to various customers via network 1740. These services may be accessed by the customer (e.g., via client 1710). Service provider 1750 may limit access to certain services based on, e.g., a customer service agreement between the customer and service provider 1750. The service agreement may allow the customer to access services that allow the customer to build and/or execute a model. In addition, the service agreement may allow the customer to further analyze models, generate code from the models, generate various reports, access audit services that allow a customer's code to be audited, etc. The service agreement may include other types of arrangements, such as certain fee-based arrangements or restricted access arrangements. For example, a customer may pay a fee which provides the customer unlimited access to a given package of services for a given time period (e.g., hourly, daily, monthly, yearly, etc.). For services not included in the package, the customer may have to pay an additional fee in order to access the services. Still other arrangements may be resource-usage based. For example, the customer may be assessed a fee based on an amount of computing resources used, network bandwidth used, etc.

Target environment 1760 may include a device that receives information from client 1710, service provider 1750, or cluster 1770. For example, target environment 1760 may receive executable code from client 1710, where the executable code allows target environment to perform an operation when the code is executed. Client 1710 may have generated the executable code using TCE 1720, graphical modeling software 1730, and/or a code generator (not shown in FIG. 17).

Cluster 1770 may include a number of processing resources that perform processing on behalf of another device, such as client 1710, service provider 1750 and/or target environment 1760. Cluster 1770 may include logic that manages and/or coordinates the operation of multiple processing resources. For example, cluster 1770 may send data to and/or receive results from these processing resources. In an embodiment, cluster 1770 may include units of execution (UEs) 1780a, b, c, and d (collectively UEs 1780) that may perform processing on behalf of client 1710 and/or another device, such as service provider 1750. An example embodiment may be implemented on one or more UEs 1780.

UEs 1780 may include hardware, software, or hybrid logic that performs processing operations on behalf of TCE 1720. For example, in an embodiment UEs 1780 may parallel process portions of a graphical model created by user of client 1710. This parallel processing may include performing analysis on the model, parsing the model into portions, and/or aggregating results from respective UEs 1780 into a single result for display to a user at client 1710. UEs 1780 may reside on a single device or chip or on multiple devices or chips. For example, UEs 1780 may be implemented in a single application specific integrated circuit (ASIC) or in multiple ASICs. Likewise, UEs 1780 can be implemented in a single computer system using virtualization techniques. Other examples of UEs 1780 may include field programmable gate arrays (FPGAs), complex programmable logic devices (CPLDs), application specific instruction-set processors (ASIPs), microprocessors, etc.

Example Computing Architecture Example System

Figure 18:
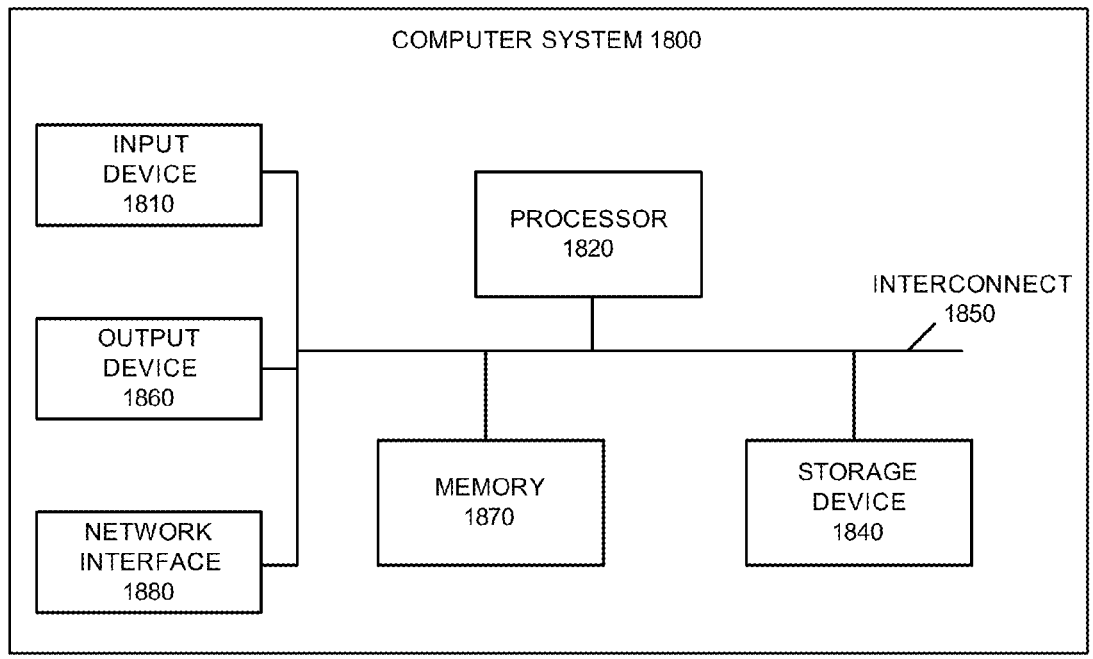
FIG. 18 illustrates an example of a computer system that may be used for practicing an embodiment of the invention.

FIG. 18 illustrates an example of a computer system 1800 that may be configured to practice an embodiment of the invention. For example, computer system 1800 may be used to implement client 1710, service provider 1750, target environment 1760, programming environment 100, etc. Computer system 1800 may include processor 1820, memory 1870, storage device 1840, input device 1810, output device 1860, and network interface 1880. Processor 1820 may include logic configured to execute computer-executable instructions that implement embodiments of the invention. An example of a processor that may be used with the invention includes the Pentium® processor, Core i7® processor, or Xeon® processor all available from Intel Corporation, Santa, Clara, Calif. The instructions may reside in memory 1870 and may include instructions associated with TCE 1720.

Memory 1870 may be a computer-readable medium that may be configured to store instructions configured to implement embodiments of the invention. Memory 1870 may be a primary storage accessible to processor 1820 and can include a random-access memory (RAM) that may include RAM devices, such as, for example, Dynamic RAM (DRAM) devices, flash memory devices, Static RAM (SRAM) devices, etc. Storage device 1840 may include a magnetic disk and/or optical disk and its corresponding drive for storing information and/or instructions.

Interconnect 1850 may include logic that operatively couples components of computer system 1800 together. For example, interconnect 1850 may allow components to communicate with each other, may provide power to components of computer system 1800, etc. In an embodiment of computer system 1800, interconnect 1850 may be implemented as a bus.

Input device 1810 may include logic configured to receive information for computer system 1800 from, e.g., a user. Embodiments of input device 1810 may include keyboards, touch sensitive displays, biometric sensing devices, computer mice, trackballs, pen-based point devices, etc. Output device 1860 may include logic configured to output information from computer system 1800. Embodiments of output device 1860 may include cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc.

Network interface 1880 may include logic configured to interface computer system 1800 with a network, e.g., network 1840, and may enable computer system 1800 to exchange information with other entities connected to the network, such as, for example, service provider 1850, target environment 1860 and cluster 1870. Network interface 1880 may be implemented as a built-in network adapter, network interface card (NIC), Personal Computer Memory Card International Association (PCMCIA) network card, card bus network adapter, wireless network adapter, Universal Serial Bus (USB) network adapter, modem or any other device suitable for interfacing computer system 1800 to any type of network.

It should be noted that embodiments may be implemented using some combination of hardware and/or software. It should be further noted that a computer-readable medium that includes computer-executable instructions for execution in a processor may be configured to store embodiments of the invention. The computer-readable medium may include volatile memories, non-volatile memories, flash memories, removable discs, non-removable discs and so on. In addition, it should be noted that various electromagnetic signals such as wireless signals, electrical signals carried over a wire, optical signals carried over optical fiber and the like may be encoded to carry computer-executable instructions and/or computer data on e.g., a communication network for an embodiment of the invention.

A hardware unit of execution may include a device (e.g., a hardware resource) that performs and/or participates in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, in one implementation, a hardware unit of execution may include a single processing device that includes multiple cores, and in another implementation, the hardware unit of execution may include a number of processors 1820. A hardware unit of execution may also be a processor or programmable device, such as a micro processor, a central processing unit (CPU), a field programmable gate array (FPGA), an application specific integrated circuit (ASIC), a digital signal processor (DSP), an embedded processing device, etc. Devices used in a hardware unit of execution may be arranged in substantially any configuration (or topology), such as a grid, ring, star, etc. A hardware unit of execution may support one or more threads (or processes) when performing processing operations.

A software unit of execution may include a software resource (e.g., a technical computing environment [e.g., MATLAB® software], a worker, a lab, etc.) that performs and/or participates in parallel programming activities. For example, a software unit of execution may perform and/or participate in parallel programming activities in response to receipt of a program and/or one or more portions of the program. In an embodiment, a software unit of execution may perform and/or participate in substantially any type of parallel programming using one or more hardware units of execution. Embodiments of a software unit of execution may support one or more threads and/or processes when performing processing operations.

A TCE 1720 may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc.

In one implementation, the TCE 1720 may include a dynamically typed language that can be used to express problems and/or solutions in mathematical notations familiar to those of skill in the relevant arts. For example, the TCE 1720 may use an array as a basic element, where the array may not require dimensioning. These arrays may be used to support array programming in that operations can apply to an entire set of values, such as values in an array. Array programming may allow array based operations to be treated as a high-level programming technique or model that lets a programmer think and operate on whole aggregations of data without having to resort to explicit loops of individual non-array, i.e., scalar operations.

A TCE 1720 may further be adapted to perform matrix and/or vector formulations that can be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

A TCE 1720 may further provide mathematical functions and/or graphical tools (e.g., for creating plots, surfaces, images, volumetric representations, etc.). In one implementation, the TCE 1720 may provide these functions and/or tools using toolboxes (e.g., toolboxes for signal processing, image processing, data plotting, parallel processing, optimization, etc.). In another implementation, the TCE 1720 may provide these functions as block sets (e.g., an optimization block set). In still another implementation, the TCE 1720 may provide these functions in another way, such as via a library, etc. The TCE 1720 may be implemented as a text based environment, a graphically based environment, or another type of environment, such as a hybrid environment that is both text and graphically based.

Alternative Embodiments

An alternative embodiment may implement a TCE 1720 using one or more text-based products. For example, a text-based TCE 1720, may be implemented using products such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; R created by Ross Ihaka and Robert Gentleman; or Modelica or Dymola from Dynasim.

Other embodiments may implement a TCE 1720 in a graphically-based TCE 1720 using products such as, but not limited to, Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment.

Another alternative embodiment may be implemented in a language that is compatible with a product that includes a TCE 1720, such as one or more of the above identified text-based or graphically-based TCE's 1720. For example, MATLAB® (a text-based TCE 1720) may use a first command to represent an array of data and a second command to transpose the array. Another product, that may or may not include a TCE 1720, may be MATLAB®-compatible and may be able to use the array command, the array transpose command, or other MATLAB® commands. For example, the other product may use the MATLAB® commands to suggest proper identifiers when an unknown identifier is presented.

Yet another alternative embodiment may be implemented in a hybrid TCE 1720 that combines features of a text-based and graphically-based TCE 1720. In one implementation, one TCE 1720 may operate on top of the other TCE 1720. For example, a text-based TCE 1720 (e.g., MATLAB®) may operate as a foundation and a graphically-based TCE 1720 (e.g., Simulink) may operate on top of MATLAB® and may take advantage of text-based features (e.g., commands) to provide a user with a graphical user interface and graphical outputs (e.g., graphical displays for data, dashboards, etc.).

CONCLUSION

Implementations may provide devices and techniques that implement constrains on the ability to subclass classes. Various algorithms may exist to assist in identifying compatible class types (e.g., non-handle classes as combinable with handle classes); identifying allowable subclass sets; disallowing specific class or classes from being subclassed by a given class; restricting subclasses by selecting subclasses of exactly a specified number, at least a specified number, or at most a specified number of classes from a fixed set; or a combination of the above.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 3-6, 8, 10, 13, and 15-16, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 17 and 18, depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

Headings and/or subheadings used herein are used to segment this patent application into portions to facilitate the readability of the application. These headings and/or subheadings are not intended to define or limit the scope of the invention disclosed and/or claimed in this patent application.

The terms class and classes as used in the claims and specification may refer to the actual class itself or to a class identifier which is representative of the class. A class identifier may include, but is not limited to, a name, a serial number, an object that identifies the class, or by some other means of referencing a class.

Code examples used throughout this application may have been written in the MATLAB® by The MathWorks, Inc. language, but similar implementations may be written in other types of programming languages such as, but not limited to, C/C++, Fortran, Forth, ADA, Pascal, JavaScript, Python, C#, Java, Visual Basic, etc.

The scope of the invention is defined by the claims and their equivalents.

What is claimed is:

1. One or more tangible non-transitory computer-readable storage media comprising one or more computer-executable instructions executable by processing logic, the computer-executable instructions to:
   define a first class, a second class, and a superclass in a programming environment, the program environment permitting multiple inheritance;
   define a first relationship between the first class and the superclass in the programming environment, wherein the first class is a subclass of the superclass;
   define a second relationship between the second class and the superclass in the programming environment, wherein the second class is not compatible with the superclass; and
   prevent another class from being defined as a subclass of both the first class and the second class based on the first relationship and the second relationship in the programming environment.

2. The one or more tangible non-transitory computer-readable storage media of claim 1, further comprising instructions to:

define the first class as a handle class, to yield a handle first class;
define a third class as a non-handle class, to yield a non-handle third class;
define a class attribute identifying the non-handle third class as combinable with the handle first class; and
define a subclass of the third class and the first class.

3. The one or more tangible non-transitory computer-readable storage media of claim 1, further comprising instructions to:
define a class list for the first class, the class list including at least one permitted subclass;
define at least one subclass of the first class from the class list for the first class; and
prevent at least one subclass of the first class from being defined for classes absent from the class list for the first class.

4. The one or more tangible non-transitory computer-readable storage media of claim 1, further comprising instructions to:
define a class list for the first class and setting the class list to empty, to yield an empty class list; and
prevent a subclass of the first class from being defined based on the empty class list.

5. The one or more tangible non-transitory computer-readable storage media of claim 1, further comprising instructions to:
define the first class as incompatible with a third class; and
prevent the third class from being a subclass of the first class.

6. The one or more tangible non-transitory computer-readable storage media of claim 5, further comprising instructions to:
define a fourth class as a subclass from the first class; and
prevent the fourth class from being a subclass of the third class.

7. The one or more tangible non-transitory computer-readable storage media of claim 1, further comprising instructions to:
define a plurality of class lists for the first class, the class lists including at least one class;
select a first class list from the plurality of class lists;
define non-selected class lists from the plurality of class lists as excluded class lists;
define a third class as a subclass of the first class and as a subclass of the classes identified by the classes of the first class list; and
prevent the third class from being a subclass of the classes identified by the classes of the excluded class lists.

8. The one or more tangible non-transitory computer-readable storage media of claim 1, further comprising instruction to:
define a first class list of a plurality of classes for the first class;
define a second class list of a plurality of classes that are a subset of the classes of the first class list; and
define a third class as a subclass of the first class and as a subclass of classes from the second class list.

9. The one or more tangible non-transitory computer-readable storage media of claim 8, further comprising instructions to:
determine whether a number of classes in the second class list is at least a minimum number; and
insert an additional class into the second class list from the first class list.

10. The one or more tangible non-transitory computer-readable storage media of claim 8, further comprising instructions to:
determine whether a number of classes in the second class list is a maximum number; and
prevent insertion of additional classes into the second class list.

11. The one or more tangible non-transitory computer-readable storage media of claim 1, further comprising instructions to:
define a first plurality of class lists for the first class, the class lists in the first plurality of class lists including at least one class;
define a second plurality of class lists for the first class, the class lists in the second plurality of class lists including at least one class;
select a first class list from the first plurality of class lists and preventing selection of remaining lists from the first plurality of class lists;
select a second class list from the second plurality of class lists;
define a third class as a subclass of the first class and as a subclass of the classes identified by the first class list; and
prevent the third class from becoming a subclass of the classes identified by the second class list.

12. The one or more tangible non-transitory computer-readable storage media of claim 1, wherein the computer-executable instructions are downloaded to a computer system, to yield downloaded instructions, which when executed by the computer system causes the computer system to perform operations comprising the downloaded instructions.

13. The one or more tangible non-transitory computer-readable storage media of claim 1, wherein the computer-executable instructions are performed in a distributed environment.

14. A method for operating a programming environment using a computer, the method comprising:
defining by the computer a first class in the programming environment, the program environment permitting multiple inheritance;
defining by the computer a class list for the first class, the class list including at least one permitted subclass;
inserting a second class into the class list;
defining the second class as a subclass from the first class based on the class list for the first class; and
preventing a third class from being a subclass from the first class based on a relationship between the third class and the first class, where the third class was not in the class list.

15. A computer-implemented method, the method comprising:
downloading software to a computer system, which when executed by the computer system causes the computer system to perform operations comprising the method of claim 14.

16. A computer-implemented method, the method comprising:
performing the method of claim 14 in a distributed environment.

17. A computer-implemented system for operating a programming environment, the computer-implemented system comprising:
a processor having memory storing processor-executable instructions for the programming environment; and
the processor to perform the following according to the processor-executable instructions:

defining a first class, a second class, and a third class, the program environment permitting multiple inheritance;

defining the second class as being compatible with the first class;

defining the third class as being incompatible with the first class;

defining a fourth class as a subclass of both the first class and the second class; and preventing a fifth class from being a subclass of both the first class and the third class based on the third class being incompatible with the first class.

* * * * *